(12) United States Patent
Solari et al.

(10) Patent No.: US 12,071,994 B2
(45) Date of Patent: Aug. 27, 2024

(54) RESIDUAL BRAKING TORQUE INDICATION DEVICES, SYSTEMS, AND METHODS

(71) Applicant: ITT ITALIA S.R.L., Barge (IT)

(72) Inventors: Mattia Solari, Barge (IT); Marco Terranova, Turin (IT)

(73) Assignee: ITT ITALIA S.R.L., Barge (IT)

( * ) Notice: Subject to any disclaimer, the term of this patent is extended or adjusted under 35 U.S.C. 154(b) by 204 days.

(21) Appl. No.: 17/875,175

(22) Filed: Jul. 27, 2022

(65) Prior Publication Data

US 2022/0364620 A1  Nov. 17, 2022

Related U.S. Application Data

(63) Continuation of application No. 16/584,429, filed on Sep. 26, 2019, now Pat. No. 11,441,629, which is a
(Continued)

(30) Foreign Application Priority Data

Jul. 25, 2016 (IT) ..................... 102016000077944

(51) Int. Cl.
*B60T 17/22* (2006.01)
*F16D 65/08* (2006.01)
(Continued)

(52) U.S. Cl.
CPC ............ *F16D 66/021* (2013.01); *B60T 17/22* (2013.01); *B60T 17/221* (2013.01); *F16D 65/08* (2013.01); *B60T 2201/12* (2013.01); *F16D 2066/001* (2013.01); *F16D 2066/005* (2013.01); *F16D 2066/006* (2013.01); *F16D 2121/28* (2013.01)

(58) Field of Classification Search
CPC .. F16D 66/021; F16D 65/08; F16D 2066/005; F16D 2066/001; F16D 2066/006; F16D 2121/28; B60T 17/22; B60T 17/221; B60T 2201/12
See application file for complete search history.

(56) References Cited

U.S. PATENT DOCUMENTS 2,117,027 A  5/1938  Langbein
2,289,954 A  7/1942  Arndt
(Continued)

FOREIGN PATENT DOCUMENTS

CN     1678893       10/2005
CN     102317130     1/2012
(Continued)

OTHER PUBLICATIONS

European Search Report; European Application No. EP 14158449; Aug. 6, 2014.
(Continued)

*Primary Examiner* — Xuan Lan Nguyen
(74) *Attorney, Agent, or Firm* — Knobbe, Martens, Olson & Bear, LLP

(57) ABSTRACT

Various residual braking torque indication devices, systems, and methods are described. The devices, systems, and methods can include a sensorized brake pad. An output signal of the sensorized brake pad can be processed to provide an indication of a residual braking torque. The residual braking torque indicator can be calibrated to reference data to provide an actual measurement of the residual braking torque.

19 Claims, 9 Drawing Sheets

Related U.S. Application Data continuation of application No. 15/658,188, filed on Jul. 24, 2017, now Pat. No. 10,451,130.

(51) Int. Cl.
  *F16D 66/02* (2006.01)
  *F16D 66/00* (2006.01)
  *F16D 121/28* (2012.01)

(56) References Cited

U.S. PATENT DOCUMENTS

| | | |
|---|---|---|
| 3,689,880 A | 9/1972 | McKee et al. |
| 3,724,916 A | 4/1973 | Hirzel |
| 3,902,157 A | 8/1975 | Kita et al. |
| 4,023,864 A | 5/1977 | Lang et al. |
| 4,117,451 A | 9/1978 | Sato et al. |
| 4,298,857 A | 11/1981 | Robins et al. |
| 4,456,098 A | 6/1984 | Lindre |
| 4,484,280 A | 11/1984 | Brugger et al. |
| 4,495,434 A | 1/1985 | Diepers et al. |
| 4,602,702 A | 7/1986 | Ohta et al. |
| 4,623,044 A | 11/1986 | Ohta et al. |
| 4,649,370 A | 3/1987 | Thomason |
| 4,782,319 A | 11/1988 | Dell'Acqua et al. |
| 4,854,424 A | 8/1989 | Yamatoh et al. |
| 4,869,350 A | 9/1989 | Fargier et al. |
| 4,901,055 A | 2/1990 | Rosenberg et al. |
| 4,928,030 A | 5/1990 | Culp |
| 5,090,518 A | 2/1992 | Schenk et al. |
| 5,099,962 A | 3/1992 | Furusu et al. |
| 5,115,162 A | 5/1992 | Leonard et al. |
| 5,133,431 A | 7/1992 | Braun |
| 5,176,034 A | 1/1993 | Hazony et al. |
| 5,235,135 A | 8/1993 | Knecht et al. |
| 5,302,940 A | 4/1994 | Chen |
| 5,325,011 A | 6/1994 | Kahn |
| 5,404,067 A | 4/1995 | Stein |
| 5,406,682 A | 4/1995 | Zimnicki et al. |
| 5,416,415 A | 5/1995 | Dorri et al. |
| 5,419,415 A | 5/1995 | Lamb et al. |
| 5,660,215 A | 8/1997 | Nishikawa et al. |
| 5,719,577 A | 2/1998 | Pitot et al. |
| 5,839,545 A | 11/1998 | Preston et al. |
| 6,064,970 A | 5/2000 | McMillan et al. |
| 6,122,585 A | 9/2000 | Ono et al. |
| 6,179,091 B1 | 1/2001 | Takanashi |
| 6,204,786 B1 | 3/2001 | Bieth et al. |
| 6,247,560 B1 | 6/2001 | Bunker |
| 6,310,545 B1 | 10/2001 | Sapir |
| 6,339,956 B1 | 1/2002 | Huinink et al. |
| 6,345,225 B1 | 2/2002 | Bohm et al. |
| 6,414,818 B1 | 7/2002 | Tanimoto |
| 6,477,893 B1 | 11/2002 | Djordjevic |
| 6,529,803 B2 | 3/2003 | Meyers et al. |
| 6,549,126 B2 | 4/2003 | Hageman et al. |
| 6,612,736 B2 | 9/2003 | Lee et al. |
| 6,668,983 B2 | 12/2003 | Drennen et al. |
| 6,681,631 B2 | 1/2004 | Apel |
| 6,813,581 B1 | 11/2004 | Snyder |
| 6,823,242 B1 | 11/2004 | Ralph |
| 6,934,618 B2 | 8/2005 | Eckert et al. |
| 7,124,639 B1 | 10/2006 | Kurtz et al. |
| 7,127,948 B2 | 10/2006 | Tavares et al. |
| 7,331,427 B2 | 2/2008 | Mohr |
| 7,451,653 B1 | 11/2008 | Sippola |
| 7,694,555 B2 | 4/2010 | Howell et al. |
| 8,026,802 B2 | 9/2011 | Shimura |
| 8,287,055 B2 | 10/2012 | Lee |
| 8,310,356 B2 | 11/2012 | Evans et al. |
| 8,437,934 B2 | 5/2013 | Degenstein |
| 8,573,045 B2 | 11/2013 | Gotschlich |
| 8,676,721 B2 | 3/2014 | Piovesan et al. |
| 8,717,158 B2 | 5/2014 | Roach |
| 8,729,938 B2 | 5/2014 | Watanabe |
| 8,789,896 B2 | 7/2014 | Albright et al. |
| 8,958,966 B2 | 2/2015 | Nohira et al. |
| 9,187,099 B2 | 11/2015 | Powers et al. |
| 9,269,202 B2 | 2/2016 | Phelan et al. |
| 9,286,736 B2 | 3/2016 | Punjabi et al. |
| 9,316,278 B2 | 4/2016 | Moore et al. |
| 9,353,815 B1 | 5/2016 | Eden |
| 9,415,757 B2 | 8/2016 | Martinotto et al. |
| 9,635,467 B2 | 4/2017 | Miyoshi et al. |
| 9,827,961 B2 | 11/2017 | Spieker et al. |
| 9,939,035 B2 | 4/2018 | Donzelli et al. |
| 9,964,167 B2 | 5/2018 | Martinotto et al. |
| 9,988,024 B2 | 6/2018 | Schwartz et al. |
| 10,052,957 B2 | 8/2018 | Azzi |
| 10,138,968 B2 | 11/2018 | Serra et al. |
| 10,208,822 B2 | 2/2019 | Donzelli et al. |
| 10,224,128 B2 | 3/2019 | Lee |
| 10,227,064 B2 | 3/2019 | Serra et al. |
| 10,295,006 B2 | 5/2019 | Serra et al. |
| 10,408,292 B2 | 9/2019 | Donzelli et al. |
| 10,451,130 B2 | 10/2019 | Solari et al. |
| 10,495,168 B2 | 12/2019 | Serra et al. |
| 10,598,239 B2 | 3/2020 | Martinotto et al. |
| 10,677,304 B2 | 6/2020 | Donzelli et al. |
| 10,955,017 B2 | 3/2021 | Serra et al. |
| 11,047,440 B2 | 6/2021 | Serra et al. |
| 2001/0042661 A1 | 11/2001 | Treyde |
| 2001/0049577 A1 | 12/2001 | Kesselgruber |
| 2002/0047496 A1 | 4/2002 | Wierach |
| 2002/0095253 A1 | 7/2002 | Losey et al. |
| 2002/0104717 A1 | 8/2002 | Borugian |
| 2003/0111305 A1 | 6/2003 | Drennen et al. |
| 2004/0015283 A1 | 1/2004 | Eckert et al. |
| 2004/0041464 A1 | 3/2004 | Eckert et al. |
| 2004/0187591 A1 | 9/2004 | Baumann et al. |
| 2004/0238299 A1 | 12/2004 | Ralea et al. |
| 2004/0242803 A1 | 12/2004 | Ohme et al. |
| 2005/0029056 A1 | 2/2005 | Baumgartner et al. |
| 2005/0103580 A1 | 5/2005 | Kramer |
| 2005/0236104 A1 | 10/2005 | Tanaka |
| 2005/0251306 A1 | 11/2005 | Gowan et al. |
| 2006/0016055 A1 | 1/2006 | Wilkie et al. |
| 2006/0076196 A1 | 4/2006 | Palladino |
| 2006/0254868 A1 | 11/2006 | Thiesing et al. |
| 2007/0024113 A1 | 2/2007 | Thrush |
| 2007/0228824 A1 | 10/2007 | Yasukawa et al. |
| 2007/0235268 A1 | 10/2007 | Caron |
| 2007/0284713 A1 | 12/2007 | Ninomiya et al. |
| 2008/0246335 A1 | 10/2008 | Spieker et al. |
| 2009/0033146 A1 | 2/2009 | Rieth et al. |
| 2009/0133971 A1 | 5/2009 | Baier-Welt |
| 2009/0157358 A1 | 6/2009 | Kim |
| 2009/0187324 A1 | 7/2009 | Lu et al. |
| 2009/0218179 A1 | 9/2009 | Yokoyama et al. |
| 2009/0223282 A1 | 9/2009 | Yamazaki |
| 2009/0289529 A1 | 11/2009 | Ito |
| 2010/0032898 A1 | 2/2010 | Gearty |
| 2010/0186938 A1 | 7/2010 | Murata et al. |
| 2010/0210745 A1 | 8/2010 | McDaniel |
| 2010/0211249 A1 | 8/2010 | McClellan |
| 2010/0250081 A1 | 9/2010 | Kinser et al. |
| 2010/0318258 A1 | 12/2010 | Katayama et al. |
| 2011/0050406 A1 | 3/2011 | Hennig et al. |
| 2011/0125381 A1 | 5/2011 | Szell et al. |
| 2012/0055257 A1 | 3/2012 | Shaw-Klein |
| 2013/0013348 A1 | 1/2013 | Ling et al. |
| 2013/0018266 A1 | 1/2013 | Nishikubo |
| 2013/0048443 A1 | 2/2013 | Muramatsu et al. |
| 2013/0192933 A1 | 8/2013 | King et al. |
| 2014/0097951 A1 | 4/2014 | Grgic |
| 2014/0200784 A1 | 7/2014 | Nohira et al. |
| 2014/0257605 A1 | 9/2014 | Beck et al. |
| 2014/0311833 A1 | 10/2014 | Martinotto et al. |
| 2014/0337086 A1 | 11/2014 | Asenjo et al. |
| 2015/0112515 A1 | 4/2015 | Conway |
| 2016/0014526 A1 | 1/2016 | Miyoshi et al. |
| 2016/0084331 A1 | 3/2016 | Merlo et al. |
| 2016/0146279 A1 | 5/2016 | Philpott |
| 2016/0272176 A1 | 9/2016 | Furuyama |
| 2016/0341622 A1 | 11/2016 | Mensa |

(56) References Cited

U.S. PATENT DOCUMENTS

| | | |
|---|---|---|
| 2017/0052028 A1 | 2/2017 | Choudhury et al. |
| 2017/0082164 A1 | 3/2017 | Serra et al. |
| 2017/0082165 A1 | 3/2017 | Donzelli et al. |
| 2017/0082166 A1 | 3/2017 | Serra et al. |
| 2017/0082167 A1 | 3/2017 | Serra et al. |
| 2017/0267220 A1 | 9/2017 | Serra et al. |
| 2017/0331030 A1 | 11/2017 | Inoue et al. |
| 2018/0106319 A1 | 4/2018 | Solari et al. |
| 2018/0160248 A1 | 6/2018 | Murakami et al. |
| 2018/0244159 A1 | 8/2018 | Satterthwaite et al. |
| 2019/0003541 A1 | 1/2019 | Serra et al. |
| 2019/0005743 A1 | 1/2019 | Serra et al. |
| 2019/0078630 A1 | 3/2019 | Serra et al. |
| 2019/0241166 A1 | 8/2019 | Serra et al. |
| 2019/0249736 A1 | 8/2019 | Donzelli et al. |
| 2019/0351889 A1 | 11/2019 | Serra et al. |
| 2020/0088256 A1 | 3/2020 | Solari et al. |
| 2020/0124124 A1 | 4/2020 | Serra et al. |
| 2021/0071728 A1 | 3/2021 | Serra et al. |
| 2021/0148427 A1 | 5/2021 | Martinotto et al. |
| 2021/0348666 A1 | 11/2021 | Serra et al. |
| 2021/0388878 A1 | 12/2021 | Serra et al. |

FOREIGN PATENT DOCUMENTS

| | | |
|---|---|---|
| CN | 102658812 | 9/2012 |
| CN | 102785648 | 11/2012 |
| CN | 104813060 | 2/2018 |
| CN | 104821372 | 6/2018 |
| DE | 10006012 | 9/2000 |
| DE | 10230008 | 1/2004 |
| DE | 10243127 | 3/2004 |
| DE | 10259629 | 7/2004 |
| DE | 102005052630 | 3/2007 |
| DE | 102006018952 | 10/2007 |
| DE | 102006053489 | 5/2008 |
| DE | 102010010482 | 8/2011 |
| DE | 102011006002 | 9/2012 |
| DE | 10-2012-007118 | 10/2013 |
| EP | 0189076 | 7/1986 |
| EP | 0601681 | 6/1995 |
| EP | 0744558 | 11/1996 |
| EP | 0781936 | 7/1997 |
| EP | 1431606 | 6/2004 |
| EP | 1530037 | 5/2005 |
| EP | 1531110 | 5/2005 |
| EP | 1923592 | 5/2008 |
| EP | 2647866 | 10/2013 |
| EP | 2741063 | 6/2014 |
| EP | 2778462 | 9/2014 |
| EP | 2570691 | 10/2014 |
| FR | 2815040 | 4/2002 |
| GB | 2309057 | 7/1997 |
| GB | 2372825 | 9/2002 |
| GB | 2478423 | 9/2011 |
| JP | S57-011143 | 1/1982 |
| JP | S58-206458 | 12/1983 |
| JP | S61275049 | 12/1986 |
| JP | 04-054326 | 2/1992 |
| JP | H07-002107 | 1/1995 |
| JP | H09-002240 | 1/1997 |
| JP | H11-94707 | 4/1999 |
| JP | H11-125285 | 5/1999 |
| JP | 2002-130348 | 5/2002 |
| JP | 2002-538039 | 11/2002 |
| JP | 2003-104139 | 4/2003 |
| JP | 2003-205833 | 7/2003 |
| JP | 2005-035344 | 2/2005 |
| JP | 2006-193091 | 7/2006 |
| JP | 2007-224988 | 9/2007 |
| JP | 2011-116237 | 6/2011 |
| JP | 2012-202983 | 10/2012 |
| JP | 2014-234158 | 12/2014 |
| JP | 2016-516631 | 6/2016 |
| JP | 2016-521336 | 7/2016 |
| KR | 10-2002-0051429 | 6/2002 |
| KR | 10-2007-0027041 | 3/2007 |
| KR | 10-0791632 | 12/2007 |
| KR | 2009-0057640 | 6/2009 |
| KR | 10-2004-48957 | 6/2010 |
| KR | 2011-0043849 | 4/2011 |
| KR | 10-2013-0039804 | 4/2013 |
| KR | 10-2015-0045047 | 4/2015 |
| KR | 10-2016-0174510 | 12/2016 |
| KR | 10-2015-0143696 | 12/2019 |
| WO | WO 1999/08018 | 2/1999 |
| WO | WO 2004/027433 | 4/2004 |
| WO | WO 2014/170726 | 10/2014 |
| WO | WO 2014/170849 | 10/2014 |
| WO | WO 2015/013217 | 1/2015 |
| WO | WO 2016/038533 | 3/2016 |
| WO | WO 2016/189150 | 12/2016 |
| WO | WO 2018/019438 | 2/2018 |
| WO | WO 2019/171289 | 9/2019 |

OTHER PUBLICATIONS

International Search Report; International Application No. PCT/IB2013/060881; Jul. 3, 2014.
International Search Report; International Application No. PCT/IB2014/060778; Aug. 6, 2014.
International Search Report; International Application No. PCT/IB2015/056861; Jan. 18, 2016.
International Search Report in PCT Application No. PCT/EP2016/071865 dated Dec. 13, 2016 in 3 pages.
International Search Report and Written Opinion; International Application No. PCT/EP2017/059238; Aug. 10, 2017.
Chinese Office Action in Chinese Application No. 201680054121.1 dated Mar. 26, 2019 in 9 pages.
Chinese Office Action in Chinese Application No. 201680054121.1 dated Feb. 3, 2020 in 8 pages.
Chinese Office Action in Chinese Application No. 201680054121.1 dated Nov. 4, 2020 in 8 pages.
Chinese Office Action in Chinese Application No. 201680054121.1 dated Jan. 19, 2021 in 28 pages.
Chinese Office Action in Chinese Application No. 201780011871.5, dated Jun. 17, 2020 in 15 pages.
Chinese Search Report in Chinese Application No. 201780011871.5, dated Jun. 10, 2020 in 2 pages.
Chinese Office Action in Chinese Application No. 201980033093.9, dated Sep. 28, 2021, in 14 pages.
Chinese Office Action in Chinese Application No. 201980033093.9, dated Feb. 16, 2022, in 13 pages.
European Office Action in European Application No. 16770243.0 (Ref.B17603) dated Oct. 15, 2019 in 5 pages.
European Office Action in European Application No. 16770243.0 (Ref.B17603) dated Jan. 12, 2020 in 3 pages.
European Office Action in European Application No. 16770243.0 (Ref.B17603) dated Jun. 23, 2020 in 5 pages.
Indian Office Action Indian Application No. 201837009364 (PCC15904) dated Nov. 20, 2020 in 15 pages.
Official European Communication in European Application No. 16770243.0 dated Oct. 19, 2020 in 11 pages.
European Search Report and Opinion for EP Application No. 20193831.3, in 2 pages.
Written Opinion in PCT Application No. PCT/EP2016/071865 dated Dec. 13, 2020 in 6 pages.
Written Opinion in Japanese Application No. 2018513655 dated Oct. 12, 2020 in 4 pages.
Written Opinion in Japanese Application No. 2018-545192, dated Feb. 24, 2021, in 6 pages.
Written Amendment in Japanese Application No. 2018513655 dated Oct. 12, 2020 in 5 pages.
Office Action with English translation issued in Korean Application No. 10-2019-7004821, dated Feb. 10, 2021, in 18 pages.
Second Office Action with English translation in Chinese Application No. 201780045954.6, in 14 pages.
Search Report with English translation in Japanese Application No. JP 2019-503519, dated Dec. 10, 2020, in 22 pages.

(56) References Cited

OTHER PUBLICATIONS

Office Action with English translation in Japanese Application No. 2019-503519, dated Dec. 23, 2020, in 20 pages.
First Office Action with English translation in Chinese Application No. 201780045954.6, in 15 pages.
Japanese Written Amendment in Japanese Application No. 2018545192, dated Feb. 24, 2021 in 8 pages.
International Search Report and Written Opinion for Application No. PCT/EP2019/062680, dated Jun. 27, 2019, in 9 pages.
Italian Search Report for Italian Application No. IT 201800005484, mailed on Feb. 19, 2019, in 7 pages.
Italian Search Report and Written Opinion for Italian Patent Application No. It UB20151059; May 28, 2015; 7 pages.
Italian Search Report and Written Opinion for ITTO 20130307; Mar. 7, 2014; 7 pages.
Italian Search Report Coversheet for Italian Patent Application No. 102015000018714/ITUB20151184; Jan. 26, 2016; 1 page.
Italian Search Report Coversheet for Italian Patent Application No. 102015000018748/ITUB20151291; Feb. 3, 2016; 1 page.
Italian Search Report Coversheet Italian Patent Application No. 102015000018701 ITUB20151029; Feb. 3, 2016; 1 page.
Italian Search Report for Italian Patent Application No. 102015000018771 (UB20151059); Jan. 27, 2016; 1 page.
Italian Search Report for Italian Patent Application No. IO 56568 IT UB20151059; Jan. 20, 2016; 7 pages.
Italian Search Report for Italian Patent Application No. IO 56584/ITUB20151184; Jan. 14, 2016; 7 pages.
Italian Search Report for Italian Patent Application No. IO 56597/ITUB20151291; Jan. 25, 2016; 7 pages.
Italian Search Report Italian Patent Application No. IO 56565/ITUB20151029; Jan. 22, 2016; 8 pages.
Italian Search Report and Written Opinion for Italian Patent Application No. IT 201600077944 (IO 69013); May 26, 2017; 8 pages.
Japanese Office Action in Japanese Application No. 2018513655 dated Jul. 14, 2020 in 16 pages.
Japanese Office Action in Japanese Application No. 2018-545192, dated Jan. 5, 2021, in 17 pages.
Japanese Search Report in Japanese Application No. 2018513655 (0022000625) dated May 25, 2020 in 12 pages.
Von Wagner, et al., "Active Control of Brake Squeal Via 'Smart Pads'"; Oct. 10, 2004.
"The Next Generation of Hub Units"; SKF Group; 2012, www.vsm.skf.com; 32 pages.
Solyom, Stefan, et al.; "Synthesis of a Model-Based Tire Slip Controller"; 2004; Vehicle System Dynamics, pp. 475-499; http://dx.doi.org/10.1080/004231105123313868.
Gustafsson, Fredrik; "Slip-based Tire-Road Friction Estimation"; Automatica, 1997; vol. 33, No. 6; pp. 1087-1099.
Pasillas-Lepine, William; "Hybrid Modeling and Limit Cycle Analysis for a Class of Five-Phase Anti-Lock Brake Algorithms"; Feb. 1, 2006; vol. 44, No. 2; pp. 173-188.
Capra, D. et al.; An ABS Control Logic Based on Wheel Force Measurement. In: Vehicle System Dynamics; vol. 50, No. 12, pp. 1779-1796; http://porto.polito.it/2497487/.
Ait-Hammouda, Islam; "Jumps and Synchronization in Anti-Lock Brake Algorithms"; Oct. 2008, Japan, 7 pages; https://hal.archives-ouvertes.fr/hal-00525788.
Yi, Jingang; "Emergency Braking Control with an Observer-based Dynamic Tire/Rotation Friction Model and Wheel Angular Velocity Measurement"; Vehicle System Dynamics; 2003, vol. 39, No. 2; peg. 81-97.
Ray, Laura; "Nonlinear Tire Force Estimation and Road Friction Identification: Simulation and Experiments"; Automatica, vol. 33, No. 10, pp. 1819-1833; 1997.
Italian Search Report, IO 58761 (IT UB20153706), dated May 25, 2016, 8 pages.
Italian Search Report, IO 58837 (IT UB20153709), dated May 31, 2016, 7 pages.
International Search Report and Written Opinion; International Application No. PCT/EP2017/054455, filed on Feb. 27, 2017; mailed on May 3, 2017, 9 pages.
Italian Search Report and Written Opinion for Application No. IT201900015839, dated Apr. 21, 2020, in 6 pages.
PCT International Search Report for PCT Application No. PCT/EP2016/071859, dated Nov. 11, 2016, in 3 pages.
International Preliminary Report on Patentability for PCT Application No. PCT/EP2016/071859, dated Mar. 20, 2018, in 6 pages.
Written Opinion for Japanese Application No. 2018-513768, dated Apr. 16, 2021, in 2 pages.
Notice of Reasons for Refusal for Japanese Application No. 2018-513768, dated Jan. 26, 2021, in 12 pages.
First Office Action in Chinese Application No. 201680052796.2, dated Sep. 19, 2019, in 11 pages.
Second Office Action in Chinese Application No. 201680052796.2, dated Apr. 24, 2020, in 12 pages.
Third Office Action in Chinese Application No. 201680052796.2, dated Feb. 9, 2021, in 9 pages.
First Office Action in Mexican Application No. MX/a/2018/003309, dated Sep. 4, 2019, in 3 pages.
Second Office Action in Mexican Application No. MX/a/2018/003309, dated Mar. 18, 2020, in 5 pages.

RESIDUAL BRAKING TORQUE INDICATION DEVICES, SYSTEMS, AND METHODS

CROSS REFERENCE

All applications for which a foreign or domestic priority claim is identified in the Application Data Sheet as filed with the present application are hereby incorporated by reference under 37 CFR 1.57.

BACKGROUND

Field

The present disclosure relates to detection of residual braking torque (also referred to as residual drag), and in particular, to devices, systems, and methods for detecting residual braking torque in a vehicle equipped with sensorized brake pads.

Description of Certain Related Art

A braking unit is a mechanical apparatus that diverts energy from a moving system, thereby reducing the motion of the moving system. A braking unit is typically used for slowing or stopping a moving vehicle, such as by friction between a generally non-rotating brake pad and a rotating brake disk or drum. The brake pad can be pressed against the brake disk or drum by a brake caliper. Unintended interaction or contact between the brake pad and the brake disk or drum can cause unintended residual drag forces or torques.

SUMMARY OF CERTAIN FEATURES

Some braking units include sensorized brake pads. Typically, sensorized brake pads include sensors, such as shear or pressure sensors. This can enable the brake pad to detect and/or measure the forces or torques applied to the brake pad while it is installed on the vehicle. Some forces or torques experienced in a braking unit may be too small in magnitude to be directly measured by the sensors. One example, of such a force or torque is a residual braking torque caused by unintended contact within the braking unit. Although, residual braking torques are often small, they can damage the braking unit and reduce overall vehicle efficiency.

Although it can be difficult to directly measure residual braking torques with sensorized brake pads, it is possible to develop a residual braking torque indicator to detect and measure residual braking torques indirectly. When a braking unit experiences residual braking torques, certain characteristics appear in the output signals of the sensorized brake pads. These characteristics may be caused by the small vibration or contacts that occur as the wheel rotates. Because these characteristics are tied to the wheel rotation, they may be periodic. In some instances, these characteristics appear as peaks in a frequency spectrum of the output signal in the frequency domain. The peaks may change frequency (e.g., based on wheel speed) and/or amplitude (e.g., based on the amount of residual torque). For a given brake pad on a given wheel, the pattern and relative compositions of the peaks may remain generally fixed as speed and residual torque change. However, the pattern and relative compositions of peaks may vary from wheel to wheel and brake pad to brake pad, such as based on the position of the brake pad relative to the disk and/or particular manufacturing features and tolerances of the brake pad. Accordingly, it can be difficult to determine residual drag simply based on the presence, pattern, or particulars of the peaks.

However, by recognizing and processing the aforementioned characteristics in the output signal of the sensorized brake pads, it is possible to develop a braking torque indicator. In some embodiments, the output signal may be processed in the frequency domain. Such analysis can include performing a Fourier transform on the output signal, and integrating across the frequencies. The result may provide a residual torque indicator. In some embodiments, background or other unintended components can be calculated and removed from the result. In some embodiments, the output signal may be processed in the time domain. In some embodiments, background or other unintended components can be calculated and removed from the result.

The frequency domain indicator can be calibrated to provide a measurement of residual braking torque. In some embodiments, this is accomplished by testing residual braking torques over a range of values with both the residual braking torque indicator and a reference bench. Calibration may also include generating a calibration curve that relates the results of the residual braking torque indicator to the results of the reference bench.

In some embodiments, the present disclosure permits the real measurement of the residual braking torque in a vehicle due to the unwanted interaction between the brake pad and the disc, corresponding to each pad of each brake. In some embodiments, the present disclosure permits the substantially real time measurement of the residual braking torque. In some embodiments, the present disclosure permits the real measurement of residual braking torque with a level of sensitivity comparable to that of a dynamometer test. In some embodiments, the present disclosure permits the real measurement of the residual braking torque to permit the detection of the minimum clearance between the brake pads and the brake disk leading to reduced braking delay.

In some embodiments, the present disclosure provides devices and methods that permit the real measurement of the residual braking torque, using mechanism and methods that are compatible with on board installations and applications. In some embodiments, the present disclosure provides devices and methods that permit the real measurement of the residual braking torque, using mechanisms and methods that are compatible with those on board installations and applications that are connected to remote means of recording and processing.

In some embodiments, a residual torque indicator device for the detection of the residual braking torque in a vehicle equipped with disc brakes is described. the device includes, for one or more wheels of the vehicle, at least one sensor integrated into a friction material support of a brake assembly, characterized in that said sensor is connected, by an electronic circuit, to at least one electronic control unit configured for acquiring and managing the signals detected by the sensor directly from the brake assembly friction material, and at least one residual torque indicator interacting with at least one communication interface to at least one on board vehicle computer over at least one dedicated on board vehicle communication BUS. In some embodiments, the device allows for periodic or substantially constant updating in substantially real time of the residual braking torque measurements.

The devices, systems, and methods described herein have several innovative aspects, no single one of which is indispensable or solely responsible for their desirable attributes. Neither the Summary above, nor the Detailed Description below, nor the associated drawings, should be interpreted to limit the scope of the claims. No feature, element, or step is required or essential.

BRIEF DESCRIPTION OF THE DRAWINGS

Various embodiments are depicted in the accompanying drawings for illustrative purposes, and should in no way be interpreted as limiting the scope of this disclosure. Various features of different disclosed embodiments can be combined to form additional embodiments, which are part of this disclosure. Additional features and benefits of the present disclosure will become more evident from the description below.

DETAILED DESCRIPTION OF CERTAIN EMBODIMENTS

Figure 1:
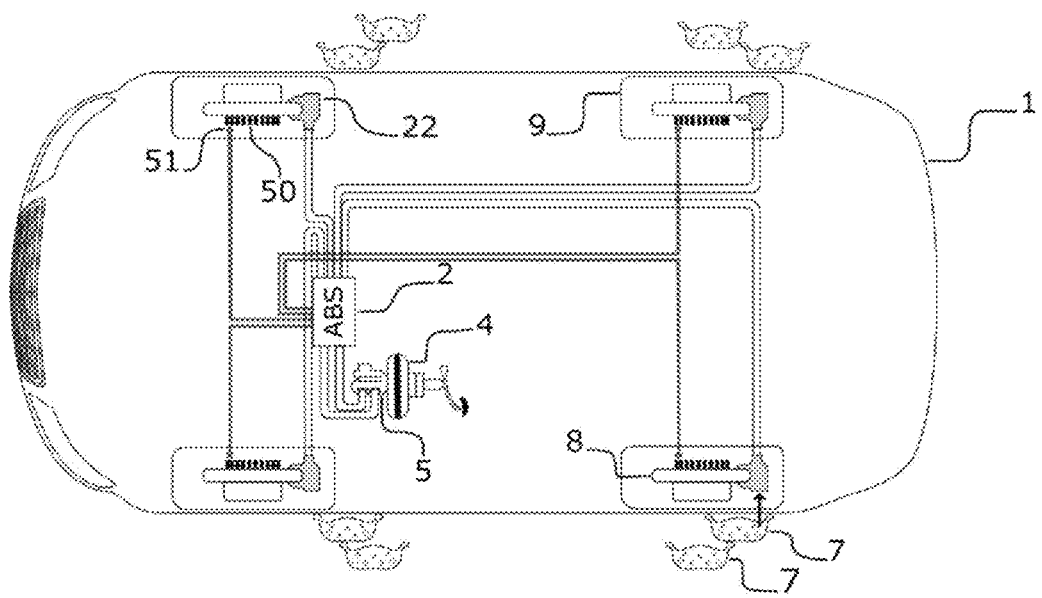
FIG. 1 is a schematic illustration of a vehicle including an embodiment of braking system.

In the following detailed description, reference is made to the accompanying drawings, which form a part hereof. In the drawings, similar reference numbers typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. The aspects of the present disclosure, as generally described herein, and illustrated in the figures, may be arranged, substituted, combined, and designed in a wide variety of different configurations, all of which are explicitly contemplated and made a part of this disclosure.

Residual Braking Torque and Braking System Overview

Braking systems typically apply a braking torque to a wheel of a vehicle to slow and/or stop motion of the vehicle. A user may perform a braking action (e.g., applying pressure to a brake pedal of the vehicle) to cause the braking system to apply the braking torque to the wheel. In a braking system that includes disk brakes, for example, calipers press brake pads against a disk (or rotor) mounted to the wheel. Friction between the brake pads and the disk causes the braking torque which slows and/or stops rotation of the wheel.

Residual braking torque (also referred to as residual drag) refers to typically unintended and/or undesired torque experienced by the braking system when an intentional braking action is not applied. In some instances, residual braking torques are caused by an unintended or accidental interaction (e.g., contact) between the brake pad and the disk when the vehicle is not braking. This condition is commonly experienced in many types of braking systems. In some instances, residual braking torques are caused by malfunctioning of the brake caliper which, after intentional braking, maintains residual contact between the disk and the brake pad.

In many (but not all) cases, residual braking torques are small in magnitude when compared, for example, with the magnitudes of intentional braking torques. For example, the residual between the disk and the brake pad, which causes the residual braking torque, may be relatively light when compared with the contact applied during braking. Even though residual braking torques are often (but not always) small in magnitude, residual braking torques are typically undesirable and can produce a number of undesirable effects on the performance of the braking system and/or vehicle. For example, the residual contact that causes residual braking torques can considerably influence fuel consumption and brake pad wear. In some instances, the effects of residual braking torques become especially significant when experienced over long periods of times.

Increasingly, governments regulate efficiency and emissions standards for vehicles. For example, new regulations in Europe (e.g., EU6 715/2007/EC) provide standards that establish sharply stringent limits $CO_2$ emissions. Such standards force motor vehicle manufacturers to constantly seek to improve vehicle efficiency. Accordingly, limiting loss of performance assumes ever increasing importance. In particular, limiting braking system inefficiencies, such as braking torques, may help in complying with these regulations. As an example, reducing or eliminating residual braking torques may serve to curb fuel consumption and consequently reduce vehicle emissions.

In part because the magnitude of residual braking torques is often small when compared with intended braking torques, residual braking torques can be difficult to detect. Previously, on board (i.e., on vehicle) systems or methods for measuring residual braking torques in substantially real-time were not available. Generally, measurement of residual braking torques has been performed in a laboratory using dynamometer test bench. Dynamometers are normally used to test and evaluate residual braking torque during the development or repair of a braking system, not in use (i.e., while driving) a vehicle. Equivalent on board automotive systems are not available due to cost and size.

For heavy vehicle applications, some sensors can measure the clearance in the caliper. These sensors, however, typically can only measure the total clearance within the entire caliper, which is the sum of the clearance of the two brake pads. These sensors are typically available only for truck based applications. These sensors typically cannot distinguish between the two brake pads, and only measure geometric distances. These systems do not perform a substantially real time measurement of residual braking torque during driving of the vehicle. For example, some such systems do not measure the distance from the disk to one or both brake pads.

The present disclosure describes devices, systems, and methods for detection and/or measurement of residual braking torques, referred to generally herein as residual braking torque indicators. In some embodiments, these devices, systems, and methods may be employed in on board (i.e., on vehicle) applications. In some embodiments, these devices, systems, and methods may permit substantially real-time detection of residual braking torques.

Figure 2:
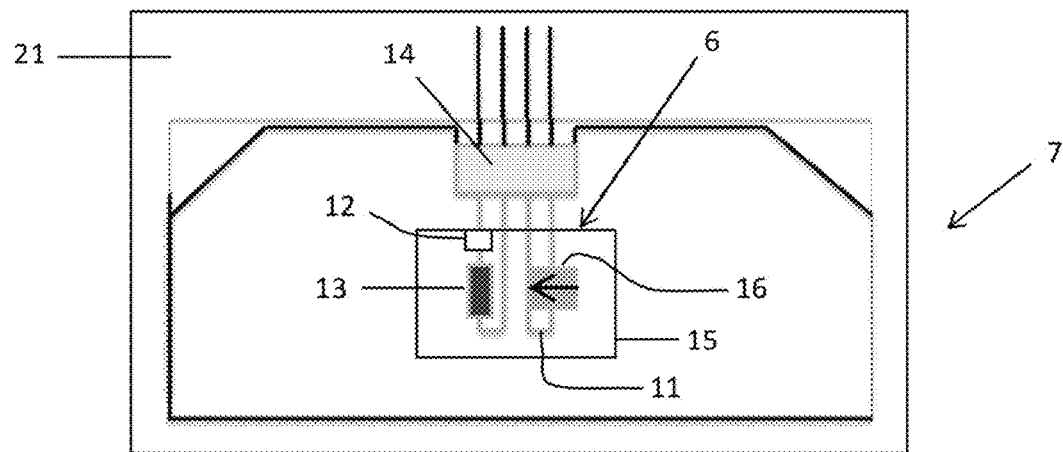
FIG. 2 is a schematic representation of an embodiment of a sensorized a brake pad.
Figure 3:
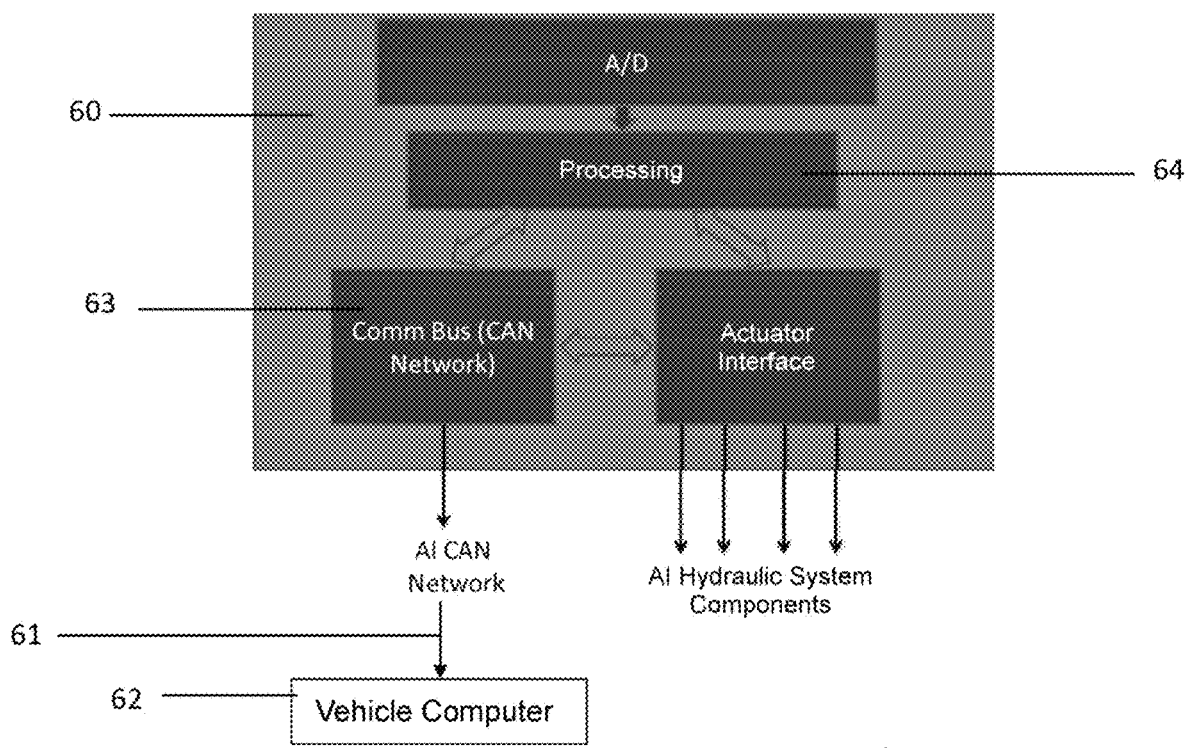
FIG. 3 is a block diagram of an embodiment an electronic control unit.

Certain components of an embodiment of a braking system configured for detection of residual braking torque are illustrated in FIGS. 1-3. FIG. 1 is a schematic representation of the braking system of a vehicle 1. FIG. 2 is a schematic representation of a sensorized brake pad 7 that can be used to detect residual braking torque. FIG. 3 is a block diagram illustrating an embodiment of an electronic control unit (ECU) 60 configured for use in some embodiments of the system.

As illustrated in FIG. 1, the system for detecting residual braking torque may be included on a vehicle 1. The vehicle 1 may comprise any vehicle that includes a braking system. The vehicle 1 maybe motorized or non-motorized. The vehicle 1 may be a car, a bus, a motorcycle, an off-road vehicles, a light trucks (e.g., pick-up truck), a commercial trucks (e.g., transport vehicle, semi-truck), etc. The braking system may comprise any type of braking system. For example, the braking system may comprise a disk brake system, a drum brake system, or others. In the illustrated embodiment, the vehicle 1 includes a disk brake system. The brake system may include a brake master cylinder 4, as illustrated. The brake system may include one or more pressure pumps 5, as illustrated. The one or more pressure pumps 5 may pressurize a braking fluid (for example, a liquid, such as hydraulic oil, or gas, such as air). The pressurized braking fluid may be distributed to brakes associated with one or more of the wheels of the vehicle for the distribution of braking pressure.

As illustrated, for some embodiments, the vehicle 1 may be equipped with an anti-lock braking system (ABS system). ABS, however, need not be included in all embodiments. An ABS system may include at least one control unit 2 for managing the ABS system. The ABS system and/or the control unit 2 of the ABS system may be integrated with an anti-slip regulation (ASR) and/or an electronic stability program (ESP) system. The braking system with ABS (if included) may comprise solenoid valves, distributors, and/or brake lines for oil or air lines. Some variants include phonic wheels 50 and tachometer sensors 51, respectively, such as for each wheel 9 of the vehicle 1 equipped with ABS.

While the description herein presents discussion of embodiments of the vehicle 1 that are equipped with an ABS braking system, the system for detecting residual braking torque may also be employed in vehicles that do not include ABS/ASR/ESP systems. In addition, while the description presents discussion of embodiments of the vehicle 1 that includes disk brakes, the residual braking torque system is applicable to any type of vehicle equipped with any type of braking system, such as disk brakes, drum brakes with brake shoes or other types of frictional elements. This disclosure can be used in connection with any type of vehicle, such as trucks, trailers, tipper-trucks, cranes, motorcycles and even airplanes.

As illustrated in FIG. 1, the vehicle 1 includes wheels 9 equipped with disk brakes 8. In some embodiments, each wheel 9 is equipped with a disk brake 8. In some embodiments, only one or more of the wheels 9 is equipped with a disk brake 8.

In several embodiments, the system 1 includes sensorized brake pads 7 (also referred to as the brake pad 7 or the pad 7). The pads 7 can include sensors 6 (see FIG. 2). As will be described below, the pad 7, including sensor 6, can be used for detecting residual braking torque. In particular, for certain embodiments, output data of the sensor 6 can be analyzed to provide a braking torque indicator.

With reference to FIG. 2, an example sensorized brake pad 7 is illustrated. As illustrated, for some embodiments, the pad 7 comprises a rear plate-shaped support 21 (also referred to herein as a back plate). A block of friction material 12 may be positioned or included in the support 21. In use, the friction material 12 may contact a disk or rotor mounted on the wheel 9 to apply a braking torque or pressure. As noted previously, the pad 7 includes one or more sensors 6. The sensors 6 may be intelligent sensors. The sensors 6 may be piezoceramic sensors. As illustrated, for some embodiments, the sensors 6 may be supported by the support 21. In some embodiments, the sensors 6 are interposed between the support 21 and the block of friction material 12. In some embodiments, the sensors 6 are embedded into the friction material 12 and/or the support 21. The sensor 6 may include one or more shear and/or pressure sensors 16 and/or one or more 13 temperature sensors 13, as described in greater detail below.

As illustrated, for some embodiments, the support 21 supports electrically isolated electrical circuits 11. The electrical circuits 11 may include electrical contacts to which the electrodes of the shear and/or pressure sensor(s) 16 are connected together with the electrodes of the temperature sensor(s) 13. The electrical circuits 11 can be produced using silk-screen printing onto the support 21. The electrical circuits 11 can be resistant to high temperatures (for example, to at least 200° C., preferably 350° C. for passenger cars, or at least 400° C., preferably 600° C. for heavy goods vehicles). The sensors 13, 16 can be attached to or embedded in the support 21 at a variety of positions, such as specific positions on the electrical circuit 11. The sensors 13, 16 can be connected, such as by being soldered or glued (e.g., using conductive glues), into place.

As shown, the brake pad 7 can include a connector 14, such as a female connector. In some embodiments, the connector 14 can close the electronic circuit and allow for connection to external electronic systems. The electrical circuits 11 can be electrically connected to the electrical connector 14. The electrical connector 14 can allow external connection to the sensors 16, which can be shear or pressure sensors, and/or to the temperature sensors 13. In certain embodiments, use of shear sensors, rather than pressure sensors, is preferred for the sensors 16. However, it is noted that either type of sensor may be used. Some embodiments use only a single pressure sensor (e.g., shear sensor) to determine residual drag. In certain embodiments, the connector 14 communicates signals coming from the sensors 16, 13 and/or allows external electronic systems to connect to the brake pad 7. As will be described below, output signals of the sensors 16, 13 may be analyzed to provide a residual braking torque indicator.

To facilitate electrical insulation and mechanical protection, a protective cap or cover 15 can be positioned at least over the sensors 16, 13 and over any conductive part of the electrical circuit 11. The protective cover 15 may be implemented, for example, by forming "caps" or "domes" made of resin or ceramic insulating materials over the protected components. In some embodiments, a damping layer is interposed between the block of friction material 12 and the support 21.

In certain embodiments, as regards the sensors 13, 16 integrated into the pad 7 for detecting residual braking torque, the brake pad 7 includes at least one pressure or shear force sensor 16. In some embodiments, one or both of the sensors 13, 16 are capable of use at high temperatures (at least greater than 200° C., preferably with an operating temperature greater than 300° C.). One or both of the sensors 13, 16 sensors can be capable of use in temperatures greater than or equal to the Curie point of the sensor, such as about 200° C. For certain embodiments, the pad 7 may also include at least one temperature sensor 13. One or both of the sensors 13, 16 may be capable of use with operating temperatures greater than 300° C.

In certain embodiments, the shear or pressure sensor 16 is positioned at or proximal to (e.g., with 1 mm, 1 cm, 2.5 cm, 5 cm, or 10 cm, the pressure center of the brake pad 7. The pressure center may be quantifiable with a reasonable approximation on the basis of the size and geometric shape of the same, together with its mass distribution. In certain embodiments, the temperature sensor 13 is positioned near (e.g., with 1 mm, 1 cm, 2.5 cm, 5 cm, or 10 cm) the shear or pressure sensor 16. In certain embodiments, the temperature sensor 13 is used, primarily, for compensation purposes.

In FIG. 2, an arrow on the shear or pressure sensor 16 indicates the direction of polarization of the sensor. The direction of polarization can be aligned with the tangential forces applied to the brake pad 7 during braking. These tangential forces can be directly linked to the braking torque measurements.

Although FIG. 2 illustrates an example of a sensorized brake pad 7, this is just one possible solution. For example, the relative positions of the sensors can be changed or other additional sensors can be added. For example, a pair(s) of piezoceramic pressure sensors could be positioned close to the upper corners of the rectangle representing the backplate 21, in order to measure the orthogonal force transmitted by the caliper piston to the pad during braking applications. In some configurations, bi-axial or tri-axial piezoelectric sensors can be used in order to supply more information than a single sensor 12. These additional sensors can have an auxiliary function, such as being used to adjust (e.g., optimize) the distribution of pressure and/or to determine the disk-pad coefficient of friction in order to increase (e.g., optimize) braking efficiency.

Additional information about sensorized brake pads and associated uses can be found in U.S. Pat. No. 9,415,757, filed Dec. 13, 2013, U.S. Patent Application Publication No. 2017/0002883, filed May 27, 2016, and U.S. Patent Application Publication No. 2017/0082164, filed Sep. 16, 2016, the entirety of each of which is incorporated by reference herein.

The braking system of the vehicle 1 of FIG. 1, including the sensorized brake pads 7 of FIG. 2 can be used to provide a residual braking torque indicator that can permit measurement of residual braking torque. In certain embodiments, this may be accomplished with system that includes sensorized brake pads 7 as described above with at least one sensor 16.

As shown in FIG. 3, The system can include at least one electronic control unit (ECU) 60. The ECU can be configured for the acquisition, analysis, and/or management of the output signals from the sensors 16 of the intelligent pad 7. The ECU 60 may analyze the output signals of the sensors 16 to provide an indication and/or measurement of residual braking torque. The ECU may employ control logic, which will be described below, for evaluation and analysis of the output signals of the sensors 16. In some embodiments, the system includes only a single pad 7 for each wheel 9. In some embodiments, the system includes a pair of pads 7 associated with each wheel 9.

The system may include at least one communication interface. The communication interface may be configured for connecting to vehicle on board services 61. The communication interface may include communication systems (including their protocols) in order to allow for the exchange of information regarding the residual braking torque with at least one on board vehicle computer 62.

With reference to FIG. 3, an embodiment of the ECU 60 is illustrated. The ECU 60 may be in communicative communication with the sensors 6 (e.g., the shear or pressure sensor 16 and/or temperature sensor 13) of a brake pad 7 of any wheel 9. In some embodiments, the ECU is spaced apart from the brake pad 7, such as being in an electronics bay of the vehicle. The ECU can be a control unit that controls various operations of the vehicle, such as anti-lock braking, traction control, or otherwise. In some embodiments, the ECU is on the brake pad 7. In some embodiments, the brake pad 7 includes a processor configured to process the output of one or more of the sensors. For example, in some embodiments a processor on the brake pad 7 determines whether the sensors on that same brake pad are outputting signals indicative of a residual torque.

In certain embodiments, signals from eight brake pads 7 will be detected, such as from the sensors 16 integrated into the brake pads 7. Each pair of brake pads 7 may be associated (e.g., connected to) a brake caliper of a wheel 9 of the vehicle 1. The signals from the sensors 16, together with signals from any auxiliary sensors, such as temperature sensors 2, may be received by the ECU 60.

These signals can be digitized, such as by using an A/D converter. The digitized signals can be by processed, according to instructions stored in a computer readable medium, by a processor 64. The instructions may cause the processor 64 to execute control logic for calculating the residual braking torque. The processor can be any of a wide variety of processors, such as a microprocessor or other processor without limitation. The computer readable medium can be a memory. The memory can be any of a wide variety of storage media, whether or not removable, and can include one or more arrays of RAM, ROM, EPROM, EEPROM, FLASH, or otherwise. In certain embodiments, the instructions are executed by the processor 64 to transform the signals (such as the raw signals or digitized signals) coming from the pads 7 into information concerning the residual braking torque. The information may be provided in substantially real time (e.g., with about or less than a 1 second delay, about or less than a 0.5 second delay, about or less than a 0.25 second delay, about or less than a 0.2 second delay, about or less than a 0.15 second delay, about or less than a 0.1 second delay, about or less than a 0.05 second delay, about or less than a 0.01 second delay, about or less than a 0.001 second delay).

Information regarding the residual braking torque can be provided to one or more additional systems for further use. For example, information regarding residual braking torque can be sent to the motor vehicle's communication network, such as for the purpose of displaying it or in order to activate an alarm, for example, an audible alarm or a light on the car dashboard. In certain implementations, the alarm is activated in response to the residual torque on the wheel being found to meet or exceed a threshold, such as about: 5 Nm, 10 Nm, 15 Nm, 20 Nm, 30 Nm, 40 Nm, 50 Nm, values between the aforementioned values, or other values. In some embodiments, information regarding residual braking torque can be sent to a remote computing device (e.g., to an app on the vehicle user's smartphone, or via SMS text or other messaging protocol). In some embodiments, information regarding the residual braking torque may also be sent to the operators of a remote service network. In certain embodiments, long-range data transmission technologies such as, for example, M2M (machine to machine) modules or other technologies, for example, wireless and cellular technologies.

In some implementations, information regarding the residual braking torque may be communicated back to the braking system for adjustment of the brake pads 7. In some embodiments, such adjustments may occur in substantially real-time. For example, a communication channel can be established via direct substantially real time interaction and/or communication with the brake caliper 22 (which is fitted with pads 7). If the caliper 22 is an active or intelligent caliper, such as by being equipped with its own actuation or adjustment mechanism (not shown), information regarding the residual braking torque may be used to allow for the active retraction of the caliper 22 based upon direct measurements made by the brake pads 7 in order to reduce, minimize, or eliminate the residual braking torque itself. In some implementations, the active or intelligent caliper is part of an electromagnetic braking system.

Residual Braking Torque Indicator Overview

The braking system described above, including sensorized brake pads 7 and ECU 60 can be configured to provide a residual braking torque indicator. The residual braking torque indicator may provide a binary indication of residual braking torque (e.g., whether residual braking torque is present or not), an indication of the degree of residual braking torque, and/or a measurement of the residual braking torque (for example, in Nm). This section describes embodiments of the residual braking torque indicator in more detail, including description of how the residual braking torque indicator can be derived from the output signals of the sensors 6 of the brake pads 7.

Residual braking torques experienced in a braking system (e.g., by the brake pad or brake caliper 22) are often within the range of between 0.5 and 30 Nm. In contrast, normal operating braking torques are usually between 30 and 4000 Nm. In part due to this disparity, it has been difficult to develop on-vehicle sensors capable of measuring residual braking torques. For example, a sensor configured to measure normal operating braking torques is unable to measure residual braking torques, in part, due to the signal to noise ratio at low torque values (e.g., values in the residual braking torque range). On the other hand, a sensor configured to measure the low range (residual braking torque rang) would likely be compromised or damaged by the forces experienced in the high torque range (normal operating braking torque range), which could lead to serious reliability concerns with the sensor.

In several embodiments, the present disclosure provides a residual braking torque indicator system or method that determines the residual braking torque using the same sensors that have been optimized for the typical braking torque range (from 30 to 4000 Nm). Thus, in certain embodiments, the residual braking torque indicator of the present disclosure increases the measurement capability of the sensors to include the range for residual braking torque measurements (from 0.5 to 30 Nm).

This is achieved, in certain embodiments, with a residual braking torque indicator that detects and/or measures a residual braking parameter that is functionally associated with the actual residual braking torque. That is, in certain embodiments, the residual braking torque indicator of the present disclosure does not directly measure the residual braking torque. Rather, in some embodiments, quantities or qualities that are associated with the presence of the residual braking torque are detected and/or measured, and the residual braking torque is determined indirectly therefrom.

As will be shown below, the residual braking torque indicator described herein can very sensitive and is capable of extending the measurement range down to the lowest typical residual braking torque values, while at the same time retaining the same efficient sensors for measuring the operational braking torque. As will be described below, certain embodiments analyze the data signals from the sensors 6 in the frequency domain or the time domain to determine the residual braking torque indicator and/or the residual braking torque.

Frequency Domain

A residual braking torque indicator has been developed that analyzes the output signals of the sensors 6 of the brake pads 7 in the frequency domain to determine residual braking torque. The residual braking torque indicator, as described below, can be calibrated to provide measurements of residual braking torque. As noted above, in certain embodiments, the residual braking torque indicator detects, analyzes, and measures properties of the output signal of the sensors 6 that are related to the residual braking torque, instead of measuring the residual braking torque directly. These properties associated with the residual braking torque can, nonetheless, be associated with the actual values of the residual braking torque, so that a determination of the residual braking torque can be derived therefrom.

As noted previously, it has been found that, when residual braking torque is present, certain characteristics are exhibited in the output signal of the sensors 6 of the brake pads 7. In some embodiments, the signals from the sensors 6 comprise a complex periodic function that can be broken down into frequencies (e.g., a sine and cosine) that represent the function. The frequencies can be analyzed in a frequency domain. It has been found that, in the frequency domain, every time there is a measurable residual braking torque, certain peak structures appear within the frequency spectrum of the output signals, $V(\omega)$, of the sensors 6 of the brake pads 7. The peak structures are associated with the presence and intensity of residual braking torque, as well as the angular rotational speed of the wheels.

Figure 4:
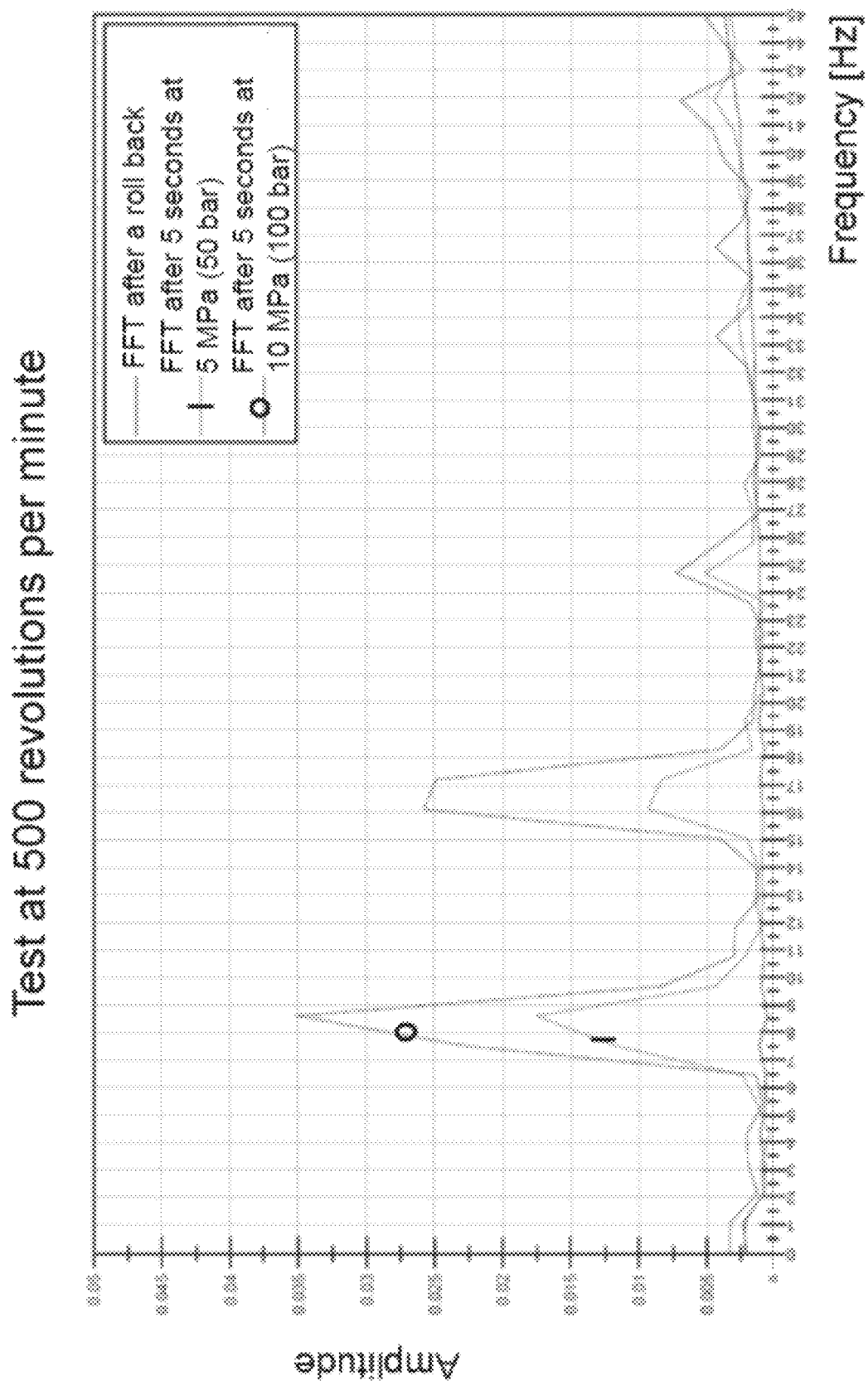
FIG. 4 displays an example frequency spectrum and of an output signal of a sensorized brake pad after three different braking conditions.

FIG. 4 shows one example of a frequency spectrum of the signal $V(\omega)$, under three different operational braking conditions, for the same angular rotational speed of the wheel and with increasing residual braking torque values. The data was obtained during tests (at the three different operational braking conditions) on a wheel rotating at 500 rpm. The frequency spectrums were obtained from the output signals of the sensors 6 of the brake pad 7 by fast Fourier transform (FFT).

The first tested braking condition illustrates the frequency spectrum of the output signal $V(\omega)$ with no residual braking torque. This data was obtained by manually "rolling back" the calipers from the rotor, such that there was no contact between the brake pads and the rotor. As shown, the frequency spectrum is relatively flat and shows no peaks of any significant magnitude.

The second and third tested braking conditions show data obtained five seconds after a braking event. The second tested braking condition shows the data five seconds after a 5 MPa (50 bar) braking force was applied to and released from the wheel. The third tested braking condition shows the data five seconds after a 10 MPa (100 bar) braking force was applied to and released from the wheel. Notably, as shown in FIG. 4, the data for each of these tests exhibits certain peaks. In the illustrated example, peaks are centered at about 8 Hz, about 16.5 Hz, and about 25 Hz. Further, for each of second and third tested conditions, the peaks occur at substantially the same frequencies, but are higher in magnitude after the larger braking event (100 MPa).

It will be noted that the specific peak structure exhibited in the frequency spectrum can vary across different brake pads 7 due in part to at least manufacturing variations in the brake pads 7 and rotors and/or variations in installation alignment between the calipers 22, brake pads 7, and/or rotors. The specific peak structure exhibited in the frequency spectrum can vary with rotational speed of the wheel. That is, peaks may occur at different frequencies depending on the rotational speed of the wheel.

The present inventors have recognized that the presence and size of these peaks in the frequency spectrum of the output signal $V(\omega)$ is related to the presence and intensity of a residual braking torque. Thus, these signals can be analyzed or processed to provide a residual braking torque indicator.

In certain embodiments, the frequency signals can be integrated to provide an indicator measurement of the residual braking torque. In some variants, the area under the line plotted in FIG. 4 is calculated and used in determining the indicator measurement. See FIG. 5, which can be described as a power spectrum. The total of the power spectrum can be related to the torque on brake pad. In some embodiments, the power spectrum can be summed (e.g., integrated), which can provide an indication of torque. In certain implementations, the peaks of the spectrum provide the majority of the sum. In various embodiments, in the time domain, the sensor 6 in the brake pad can provide a signal indicative of resistance and/or current, which can be integrated to determine a charge on the sensor 6, which is directly related to the force applied to the sensor 6 (e.g., the torque on the brake pad). A similar analysis can be performed for the frequency domain. In some embodiments, the output of the sensor 6 provides a power spectrum, which is integrated to determine the charge, which is directly related to the force applied to the sensor 6. As will be described below, the indicator measurement can be calibrated to provide a measurement of the residual braking torque itself.

In certain embodiments, in order to create a residual braking torque indicator, a generic class of a function for the signal $V(\omega)$ is considered, shown in the following formula:

$$RD_I = \int_0^{\omega_c} \Sigma_{i=1}^N |V_i(\omega)|^\alpha - RD_I^0 \qquad \text{(Eq. 1)}$$

In Equation 1, $RD_I$ is the residual braking torque indicator, $\omega_c$ is the cutoff frequency of the signal, $\alpha$ is a positive constant, N is the total number of sensors 16 on the either one or both of pads 7 of a caliper, and $RD_I^0$ is the integral function of the signals as reported in the first element of the definition of $RD_I$, but obtained by the manual roll back (e.g., withdrawal) of the pads 7 into the caliper 22. In other words, $RD_I^0$ represents the contribution to the output signal $V(\omega)$ caused by other factors than residual drag, such as noise in the signal $V(\omega)$ due to external electromagnetic disturbances, vibrations from the bearings, the wheel hub, other mechanical components etc. $RD_I^0$ represents the background noise signal that is not to be considered and that is to be subtracted from the indicator. Accordingly, $RD_I^0$ represents a zeroing term that removes non-residual braking torque related components from the signal such that $RD_I$ is related substantially to only residual braking torque related factors.

The cutoff frequency of the signal $\omega_c$ can be chosen. In some embodiments, the cutoff frequency is fixed below 50 Hz. This can inhibit electromagnetic compatibility (EMC) disturbances and increase the range of angular rotation speed of the wheel to which the residual torque determination can be applied. In certain embodiments, the cutoff frequency value was set at about 40 Hz. In certain embodiments, the cutoff frequency value was set at about 45 Hz, which may provide good indicator stability up to speeds in the order of about 200 km/h. The cutoff frequency can act as a low-pass filter and/or can prevent further additions to the total (e.g., integral) above the cutoff frequency. In some embodiments, the cutoff frequency can facilitate keeping the more relevant parts of the power spectrum (e.g., the portion below about 50 Hz) and/or removing the less relevant parts of the power spectrum (e.g., the portion above about 50 Hz).

In some embodiments for $RD_I$, $\omega_c$ can significantly higher than 50 Hz, particularly if intended for use at high vehicle speeds. In such a case, a band-pass filter (hardware or software) may be used at around 50 Hz in order to reduce or eliminate electromagnetic compatibility (EMC) contributions that may influence the residual braking torque indicator.

The constant $\alpha$ can be set, in certain examples, between about 0.5 and about 4, although larger and smaller values may also be used. In certain embodiments, the constant $\alpha$ can be about 1 or about 2.

Figure 5:
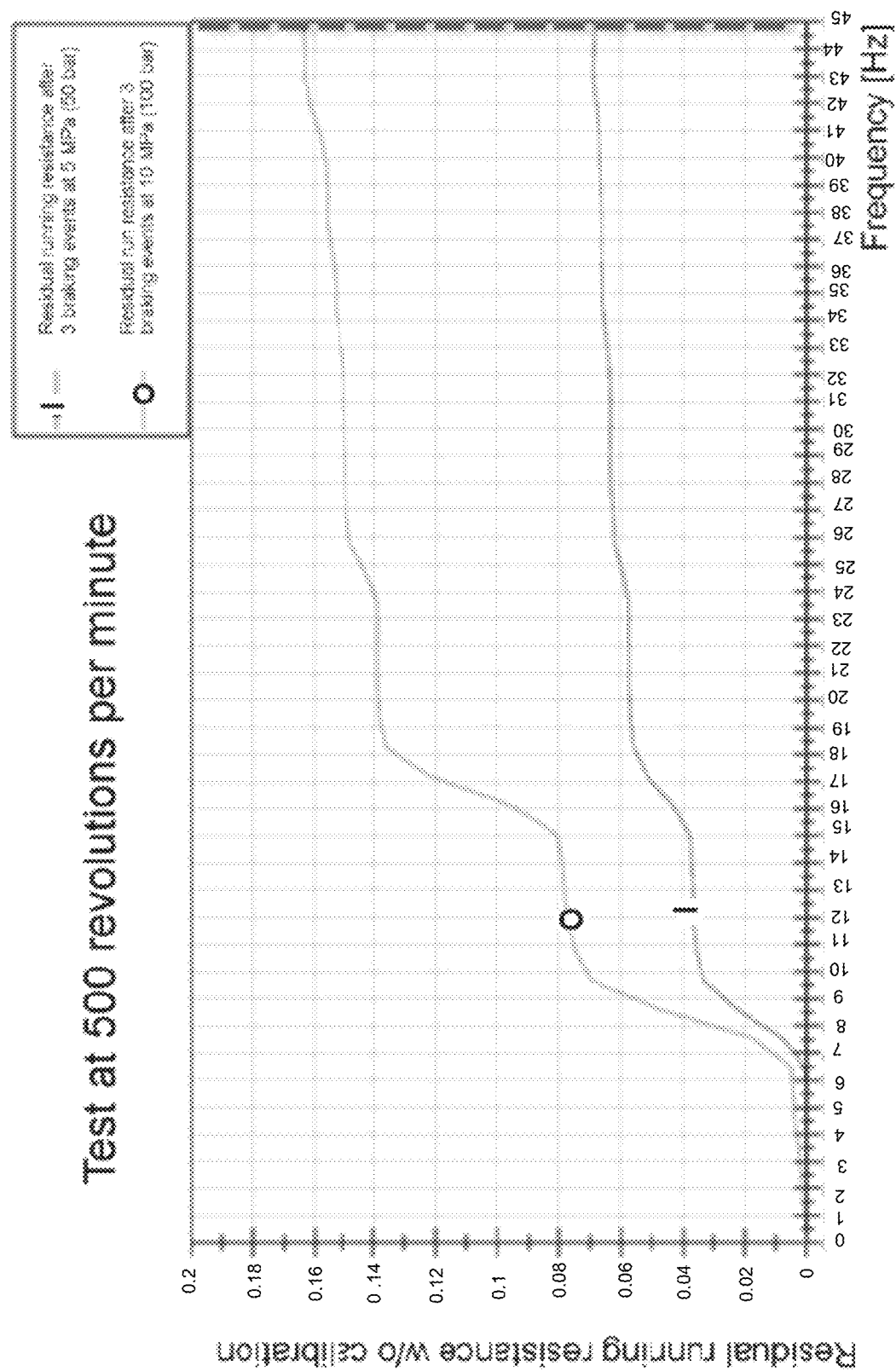
FIG. 5 displays the variation in an example residual braking indicator as a function of frequency.

Some embodiments employ similar but more generic functions than what is disclosed above. For example, some embodiments are configured to determine a residual torque indicator based on a monotone increasing function. In some embodiments, an indicator similar to those previously shown and discussed will be obtainable by using a generic function $F(V(\omega))$ on condition that a monotone increasing function F is used, in order to ensure that increasing indicator magnitudes similarly correspond to increasing quantities of residual braking torque. This disclosure is not limited to the specific formulas disclosed, FIG. 5 shows an example of the residual braking torque indicator $RD_I$ as a function of the cutoff frequency of the signal. In the illustrated example, $RD_I$ is plotted for the second and third braking events described above (5 MPa and 10 MPa), and with the cutoff frequency $\omega_c$ set to 45 Hz. As shown, increases in the $RD_I$ correspond with the frequency peaks in the graph shown in FIG. 4. In various embodiments, as discussed in more detail below, the residual braking torque indicator is adjusted with calibration values, such as in order to determine actual residual torque values.

Time Domain

A residual braking torque indicator can also be developed that analyzes the output signals of the sensors 6 of the brake pads 7 in the time domain to determine residual braking torque. As with the example described above, which was based on frequency, the time domain approach provides a residual braking torque indicator that, while not measuring residual braking torque directly, is still associated with the residual braking torque. As with the example above, the residual braking torque indicator can be calibrated (as described below) to provide a measurement of the residual braking torque.

In certain embodiments, a residual braking torque indicator $RD_I$ can be developed in the time domain as follows. Proceeding similarly to the case based on frequency, the time domain frequency function becomes:

$$RD_I = \int_0^{\omega_c} \Sigma_{i=1}^N |V_i(\omega)|^2 = \int_0^{\infty} \Sigma_{i=1}^N |V'_i(\omega)|^2 \qquad \text{(Eq. 2)}$$

where $V'_i(\omega)=V_i(\omega)K(\omega)$ with $K(\omega)$ a signal frequency filter with a cutoff frequency at a $\omega_c$.

Using the properties of the Fourier transform, time based functions can be substituted for the frequency based functions as follows:

$$RD_I = \int_0^\infty \Sigma_{i=1}^N |V'_i(\omega)|^2 = \int_0^\infty \Sigma_{i=1}^N |V_i(t) \otimes K(t)|^2 \quad \text{(Eq. 3)}$$

In Equation 3, "$\otimes$" stands for the convolution symbol. As shown on the left hand side of the equation, the integrals are functions of time instead of frequency.

Generalizing, the following general formula is obtained:

$$RD_I = \int_0^T \Sigma_{i=1}^N |V_i(t) \otimes K(t)|^\alpha - RD_I^0 \quad \text{(Eq. 4)}$$

In which $RD_I$ is the residual braking torque indicator, T is a clearly longer period of time than the typical turning periods of the wheels within ranges of speed from 5 to 200 km/h, $\alpha$ is a positive constant, N is the total number of sensors 16 on the pads 7 of a brake calipers 22 and $RD_I^0$ is the integral function of the signals as reported in the first element of the definition of $RD_I$ (as before).

In the case discussed, the time domain frequency filter algorithm $K(t)$ can easily be calculated and becomes:

$$K(t) = 2i \frac{sen(\omega_c t)}{t} \quad \text{(Eq. 5)}$$

Figure 6A:
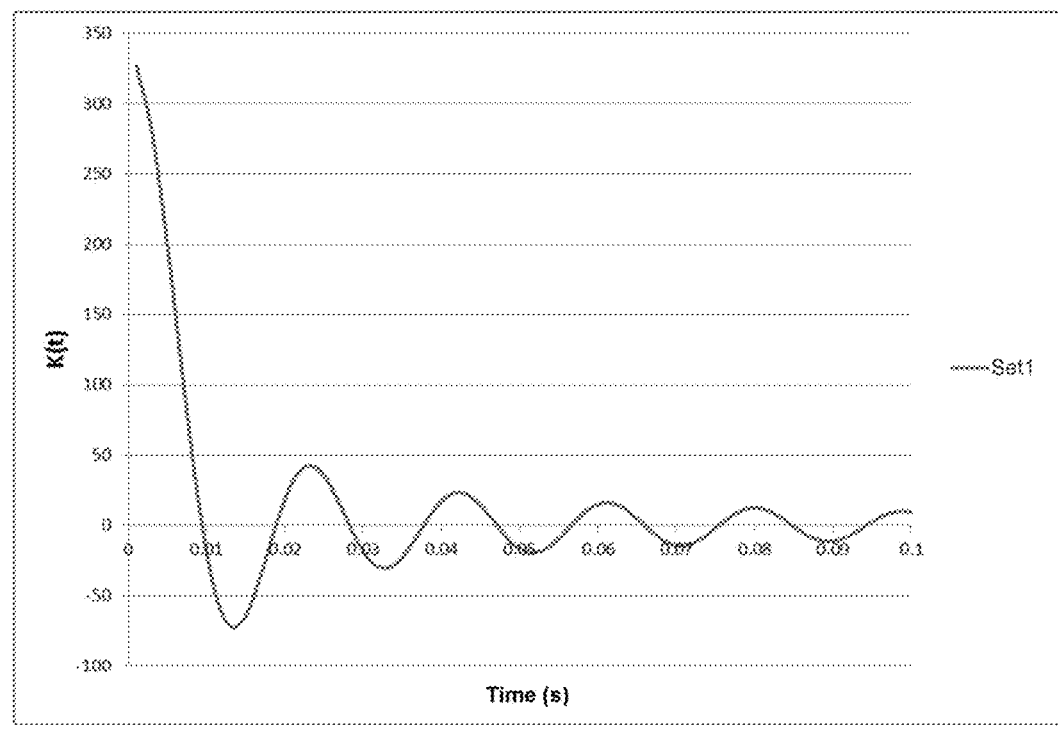
FIG. 6A illustrates an example of a time domain frequency filter that can be used in the development of a residual braking torque indicator as a function of time.

In Equation 5, i is the imaginary constant, $\omega_c$ is the filter cut-off frequency and t is time. FIG. 6a shows a graph of the behavior of this time domain frequency filter algorithm $K(t)$.

In the illustrated example, the decay of $K(t)$ over time is already significant after only 0.1 seconds, and, therefore, the fluctuations in high-frequency signals (considerably greater than the cutoff frequency of the signal $\omega_c$) will be eliminated.

In this particular case, the indicator $RD_I$ will take the form:

$$RD_I = \int_0^T \sum_{i=1}^N \left| \int_t^{t+r} V_i(t') \frac{sen(\omega_c(t-t'))}{t-t'} \right|^\alpha - RD_I^0 \quad \text{(Eq. 6)}$$

in which the convolution has been approximated with a finite integral on t' of the two functions that spans an interval of time $\tau$.

If the time interval r is quite large compared to the decay over time of the time frequency filter $K(t)$, considering that generally the temporal fluctuations that contribute to $RD_I$ through the signals $V_i(t)$ will vary very slowly over time in that they are associated with wheel rotation frequencies which are usually much lower than the cutoff frequency $\omega_c$, then the approximation will be numerically sound.

In each case, an alternative formulation for a residual braking torque indicator is presented. For reference and for example, $\tau$ could be an interval of 0.1 s.

Therefore, the above expression can be further approximated by the following expression:

$$RD_I = \sum_{j=1}^M \tau \sum_{i=1}^N \left| \int_{t_j}^{t_j+\tau} V_i(t') \frac{sen(\omega_c(t_j-t'))}{t_j-t'} \right|^\alpha - RD_I^0 \quad \text{(Eq. 7)}$$

In Equation 7, the integral of t has been approximated by a series of j and the time interval has been divided into subranges M of width $\tau$. In the particular case mentioned earlier, for example, with $\tau=0.1$ s and $T=1$ s, then $M=10$.

The expression above (Eq. 7), though approximate, has the advantage of being more computationally economical, when compared with of the previous expressions (both as functions of time and frequency). For example, this expression can be integrated into embedded systems and more economical electronic equipment, and may be, therefore, of particular benefit to substantially real time onboard vehicle applications.

In certain embodiments, removal of the filtering term $K(t)$ may be permitted, such as by setting it equal to 1 for each point in time t, and by performing simple integration without convolution. In such a case there will be the benefit of having an even more simplified and numerically speaking advantageous version for the computational load required. Whether the filtering term $K(t)$ can be removed may depend on measurement conditions and the signal to noise ratio.

Calibration

As shown above, residual braking torque indicator functions can be developed in either the frequency domain or the time domain. These functions provide an output that is indicative of the presence and magnitude of residual braking torque. In certain embodiments, once the $RD_I$ functions of the residual braking torque indicator are obtained, a calibration is desirable or necessary to relate the output of the residual braking torque indicator to the residual braking torque measurements. In some embodiments, a reference calibration bench (such as a dynamometer) is used to perform calibration, although other methods of calibration are also possible.

As described below, given that said calibration is based upon the results of $RD_I$, it will be entirely valid for both methods (based on functions of both frequency and time). That is, calibration is not specific to frequency or time domain analysis of the output signals of the sensors 16.

In general, calibration comprises testing the system with different residual braking torques and comparing the results of the residual braking torque indicator to the results of the reference bench. A calibration curve can be developed that relates the residual braking torque indicator to the results of the reference bench. The calibration curve can then be used to convert the output of the $RD_I$ functions into residual braking torque measurements.

In certain embodiments, the reference bench may be a standard laboratory dynamometer bench with residual braking torque measurement capability, or any other known device having a residual braking torque sensor to be used as reference. Generally, it is preferred that the reference calibration bench have the ability to check the residual braking torque values during the calibration process in a reliable and precise manner to maintain said values as constant as possible.

In certain embodiments, a residual braking torque calibration procedure is as follows. A value for $RD_I^0$ can be determined. This can be accomplished by the manual separation (or roll back) of the brake pads from the disk (retraction of the caliper pistons or parts of the caliper) and the acquisition of the background noise on the signals of the sensorized pads and the bench in order to remove unwanted contributions. Next, a residual braking torque is introduced. This can be done by setting the residual braking torque by manually adjusting the calibration bench, or by equivalent means in order to set the reference value. Next, with the residual braking torque introduced, data can be mutually (e.g., at the same time) acquired from both the calibration bench and the $RD_I$ residual braking torque indicator. Next, the preceding two steps can be repeated with residual braking torques of different magnitudes to produce a set of data points relating the output of the $RD_I$ residual braking torque indicator to the output of the calibration bench. Generally, calibration is formed over a range of values from between 0 to 30 Nm, although other ranges are possible. And, finally, an analytical calibration curve can be interpolated from the data set.

Some embodiments include determining a calibration function, such as a calibration curve. In some implementations, the calibration curve can be used to offset the residual braking torque indicator $RD_I$ values. In some embodiments, the calibration curve can be used to subtract noise (e.g., background noise contained within the pad signals and/or the dynamometer bench) from the residual braking torque indicator $RD_I$ in order to determine actual residual braking torque. In some embodiments, the calibration curve is derived with an analytical expression for converting the values of the residual braking torque indicator $RD_I$ to the real values of the residual braking torque (measured in units of torque, e.g., Nm) measured on the reference calibration bench. The conversion between the values of the residual braking torque indicator $RD_I$ to the real values of the residual braking torque can be stored in a lookup table or other format. The conversion can be provided to the ECU of the vehicle or another computing device. In some embodiments, the ECU is programmed to use the conversion to determine actual residual braking torque values based on residual braking torque indicator $RD_I$ values.

Figure 6B:
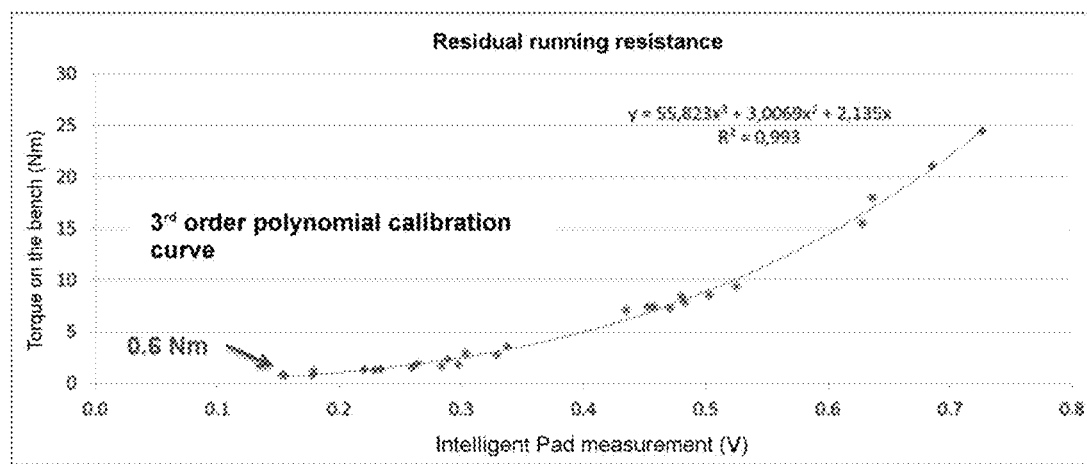
FIG. 6B represents an example calibration curve that relates output of a residual braking torque indicator and reference calibration data.

An example calibration curve is shown in FIG. 6B. In the illustrated embodiment, a third order polynomial function has been used to fit the data. Other types of functions, can also be used; although it has been found that second or third order polynomial functions generally fit the data well.

Testing and Examples

Figure 7:
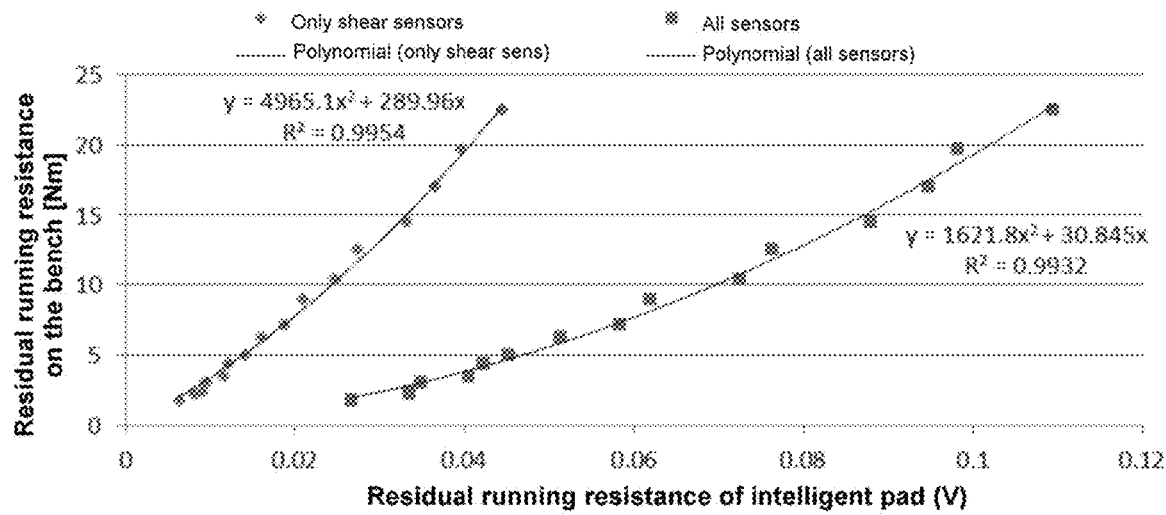
FIG. 7 illustrates two calibration curves obtained by shear sensors only and with other sensors.

FIG. 7 is a graph that depicts dependence of the calibration curve on the number N of sensors 16 of a brake pad 7. Data is illustrated for two cases. In the first case (illustrated with squares), data was obtained using all of the sensors (e.g., up to 10 sensors) of the brake pad 7. In the second case (illustrated with diamonds), data was obtained using only the shear sensors 16 (e.g., two shear sensors) on the brake pad 7. As shown, even by limiting the sensors to the shear sensors there is no significant loss in the resolution of the $RD_I$ residual braking torque indicator, and that the shape of the calibration curve has remained almost identical. That is, the data in each case was able to be modeled using a second order polynomial, although the coefficients were different. This illustrates that the accuracy of the $RD_I$ is not dependent on the number of sensors used. This is substantiated by the graphs shown in FIG. 8.

Figure 8:
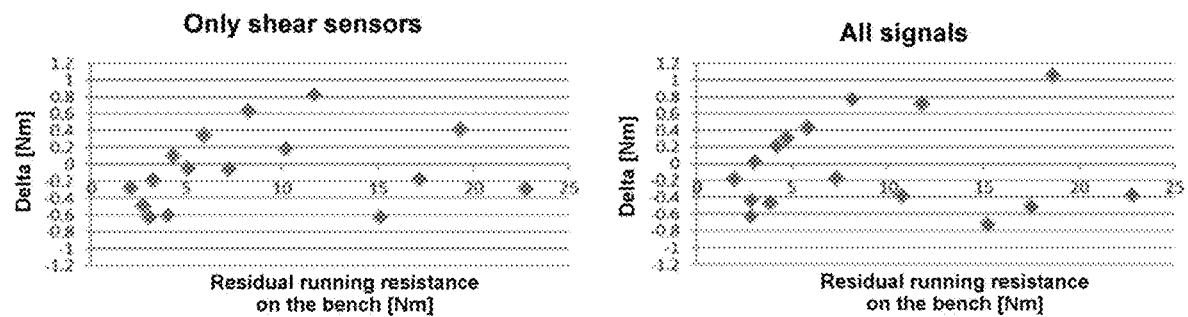
FIG. 8 shows deviations in measured values with shear sensors only and with other sensors.

FIG. 8 presents a direct comparison of the deviation between the residual braking torque values measured with the brake pads 7 using the calibration curves obtained in FIG. 7 and those of the reference calibration bench. FIG. 8 compares the calibrated result from the residual braking torque indicator to a corresponding measurement obtained with the reference bench. In FIG. 8, the left graph represents the case that is limited to shear sensors only, while the right graph represents the case where all sensors are used. As is shown in FIG. 8, the calibrated results, obtained from the residual braking torque indicator, in each case, are within ±1 Nm from those obtained with the calibration bench.

Although the preceding discussion illustrates that the residual braking torque indicator is accurate regardless of the number of sensors used, in some instances, it may be advantageous to use only the shear sensors (or to otherwise reduce the number of sensors used). This may, for example, reduce the computational load required to process the output signals of the sensors. Additionally, this may lower production costs as fewer total sensors need be integrated into the brake pad 7.

The residual braking torque indicators described herein, which are based upon signals detected by sensorized brake pads 7, have been tested under various conditions with sets of different pads and discs and different calipers.

Figure 9:
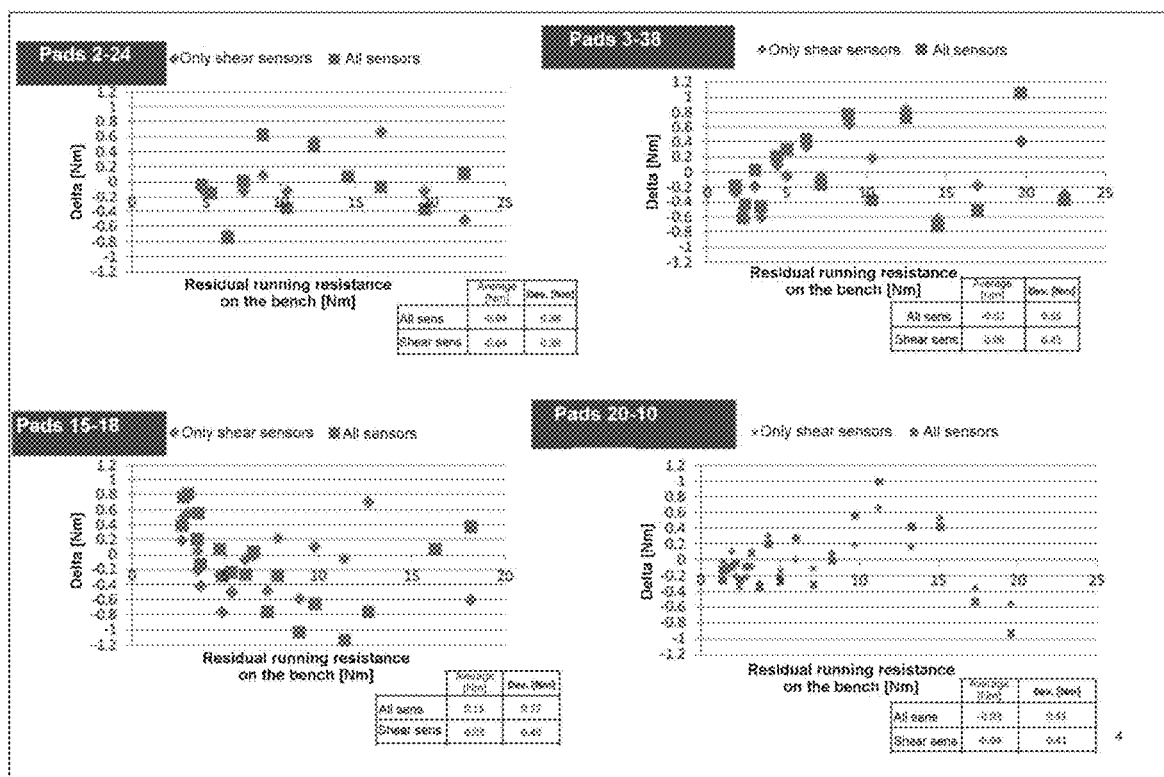
FIG. 9 illustrates the differences between the residual braking torque values measured on a reference bench and the values obtained from the calibration curves for several pairs of pads.

FIG. 9 shows the results of the error between the residual braking torque measured from the signals from the sensorized brake pads 7 and corresponding measurements taken on the reference dynamometer bench for four different sets of pads.

The differences between the results of the measurements from the pads 7 made after the calibration procedure, and the corresponding values of the measurements taken on the dynamometer bench are shown for different values of residual braking torque within the calibration range (from 0 to 30 Nm). Again, the maximum measurement error using the sensorized brake pads 7 with respect to the measurements taken on the dynamometer bench is within 1 Nm. Given that a laboratory dynamometer bench typically has an accuracy of 0.5 Nm, this means that the accuracy of the measurements using the sensorized brake pads 7 for measuring the residual braking torque is comparable to the accuracy of the measurement on a dynamometer bench.

The results are shown for both of the cases described above: results with all of the sensors on the intelligent pad (10 sensors per brake/pair of sensorized brake pads 7, i.e. 5 per each sensorized brake pads 7) and results with shear sensors only on the intelligent pad (2 sensors per brake/pair of sensorized brake pads 7, i.e. 1 shear sensor per each sensorized brake pads 7). Further, the table below the various graphs reveals the statistical findings regarding the average error, maximum error, and standard deviations, which confirm the good performances of the calibration curves obtained for the four pairs of intelligent pads. The maximum measurement error using the sensorized brake pads 7 with respect to the measurements taken on the dynamometer bench is within 1 Nm.

The residual braking torque indicator described herein was also tested under real-world conditions on board a motor vehicle. To this end, the brake calipers of a passenger car were equipped with intelligent pads and specific dedicated tests were performed on a test track (the Nardò circuit).

The test involved comparing the substantially real time measurements taken using sensorized brake pads 7 (on the track) with measurements performed (after the fact) in a laboratory using an external sensor, reproducing the conditions of the vehicle speed (e.g., inducing the rotation of the wheel, activating a braking event as performed at the circuit and recording the residual braking torque values during a wheel revolution). Repeating the procedure several times, a measurement was obtained which was then compared with the stable values obtained at the end of the test session on the track. The results are shown in FIG. 10.

Figure 10:
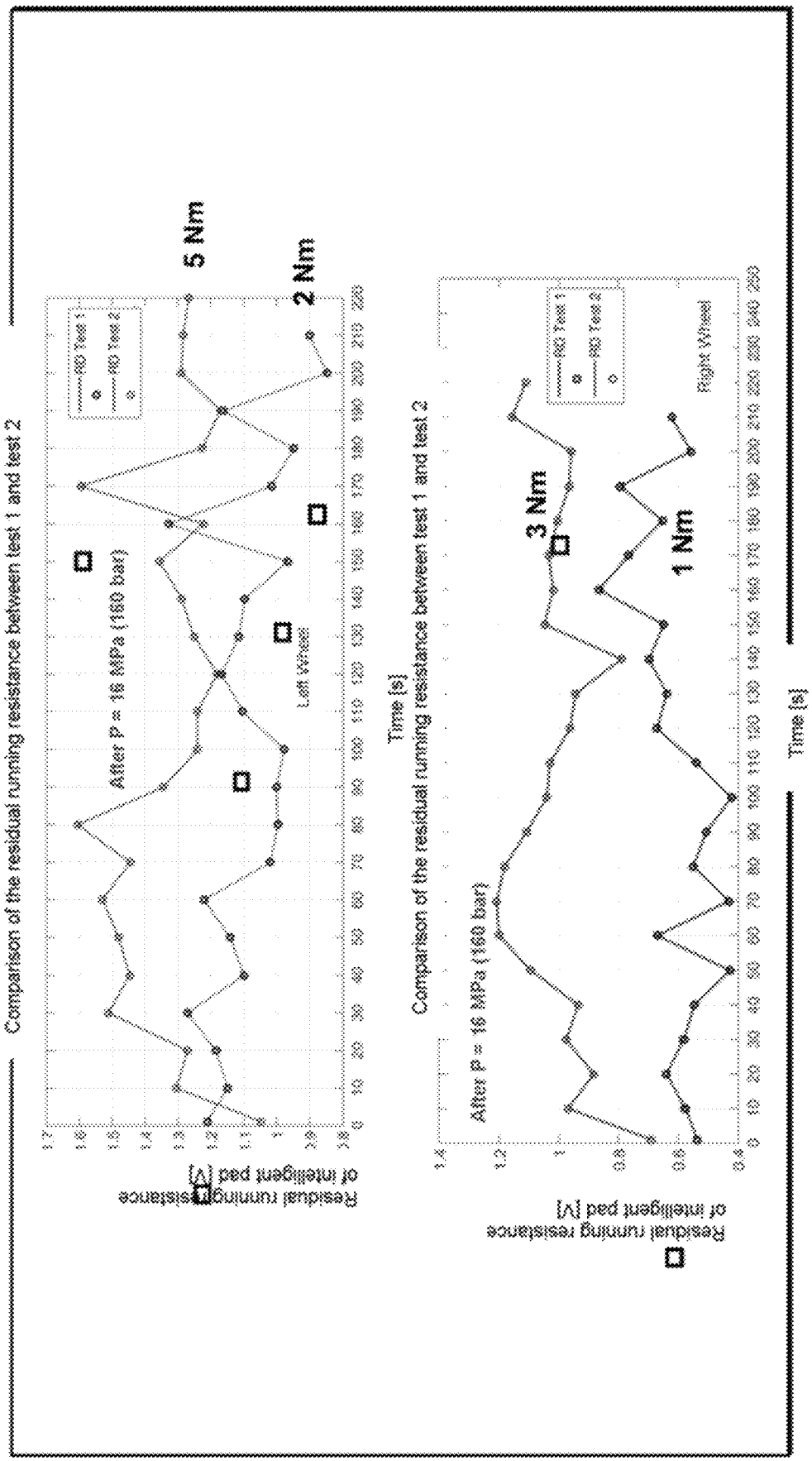
FIG. 10 illustrates experimental residual braking values both before and after the application of braking event to a passenger car.

FIG. 10 shows the results produced by the sensorized brake pads 7 after a braking event of 16 MPa (160 bar) and those obtained before applying the brakes. It can be seen how the braking event has induced greater residual braking torque, up to 5 Nm, than the residual braking torque under the preliminary braking condition.

The experimental results obtained after the test in the lab are illustrated with square boxes in the graphs of FIG. 10. Although illustrated within an axis of torque versus time, it will be appreciated that no time values are associated with these results. Rather, they are placed on the graph only for comparison with the real-time data. Notably, the results obtained in the lab are within 1 Nm of those obtained on the track.

Figure 11:
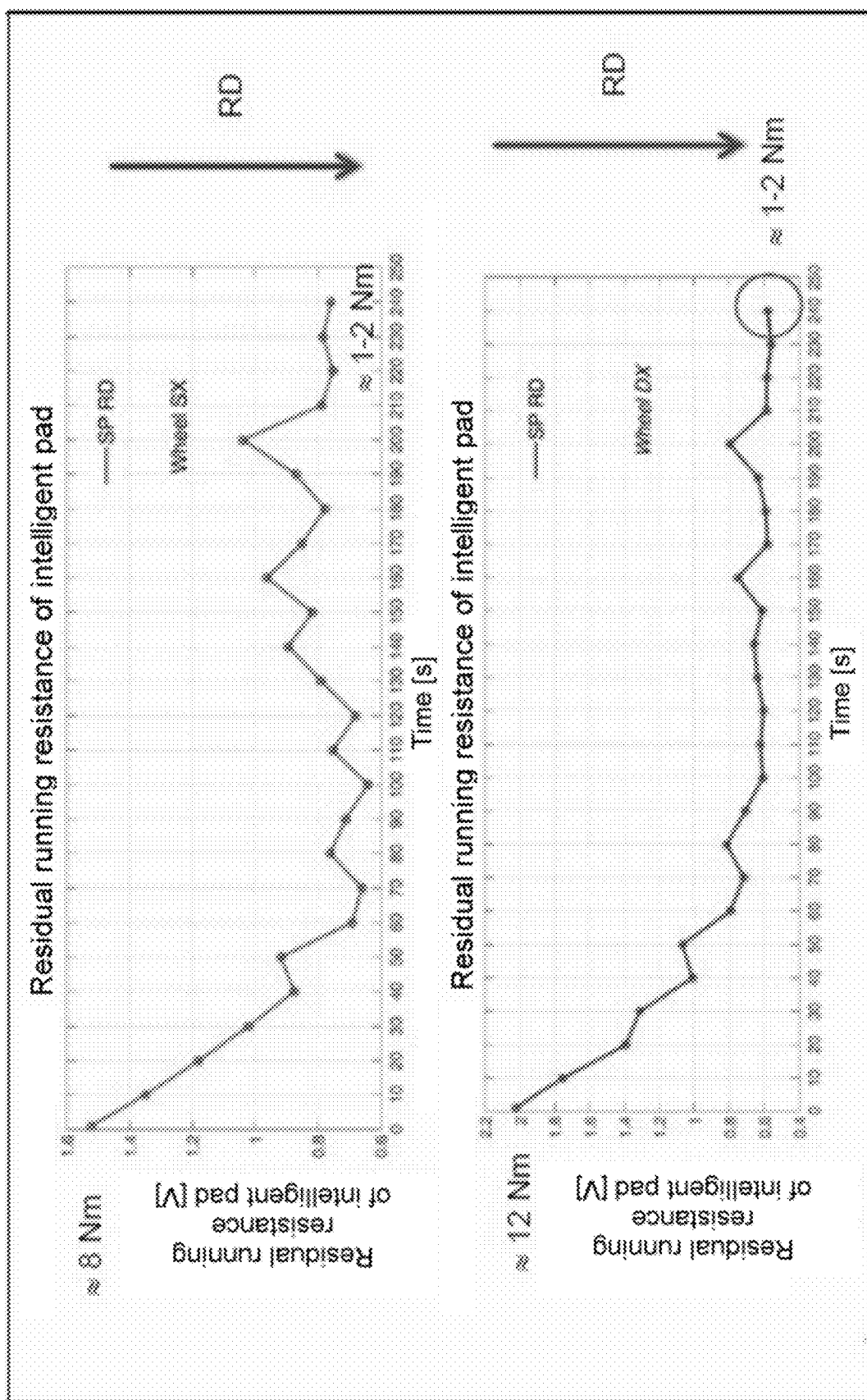
FIG. 11 illustrates experimental residual braking values as a function of time with a passenger car.

The residual braking torque indicator described herein can be used to analyze residual braking torque over time. FIG. 11 illustrates residual braking torque over time after two braking events (one of 8 Nm (top) and one of 12 Nm (bottom). As shown, just after braking the residual braking torque values measured are greater, up to 10 Nm or more, but then the differences quickly reduce down to values of 1-2 Nm and tend to remain stable over time.

When comparing these values with those obtained in the laboratory using measurements taken by means of external torque sensors, they are once again very similar, within differences of 1-2 Nm.

Advantages of Certain Embodiments

The residual braking torque indicators described herein may provide one or more of the following advantages.

In some embodiments, the residual braking torque indicators are capable of measuring the residual braking torque values of a vehicle equipped with disk brakes. This may be accomplished using on board devices (e.g., sensorized brake pads 7 and ECU 60). This may be accomplished in substantially in real time. In some embodiments, the residual braking torque indicators are capable of providing good repeatability of results and an accuracy that is comparable with the results obtained by means of a reference dynamometer test bench.

In some embodiments, the residual braking torque indicators can be used, among the other applications, to provide, instructions to so-called intelligent brake calipers to make adjustments to reduce or eliminate residual braking torques. For example, the residual braking torque indicator may provide a basis for the actuation and retraction of the actuating piston of the pads to minimize the clearance of these with the disk and at the same time reduce the residual braking torque to values below 0.5 Nm. In some embodiments, the residual braking torque indicators can be used, among the other applications, to provide, instructions to electromagnetic braking systems to make adjustments to reduce or eliminate residual braking torques.

An advantage made possible by this application of the invention, will be the minimization of the clearance between pads and brakes. This can result in a consequently reduced (e.g., minimized) delay in applying the brakes, the control and reduction (e.g., minimization) of residual braking torque with low brake pad wear and reduced fuel consumption, the reduction (e.g., minimization) of the effect of aging and wear on the retraction materials, and/or the increase (e.g., maximization) of the efficiency of the brake caliper. Various such advantages can be thanks to the direct control in substantially real time of the residual braking torque level. In various embodiments, identifying and rectifying residual drag can reduce wear on the brake pad and/or can increase fuel economy of the vehicle.

The residual braking torque measurements detected in real time onboard the vehicle using the residual braking torque indicators described herein can be sent to an off board communication unit. For example, the residual braking torque indicators can be sent in in substantially real time using specific communication and/or connection mechanisms to at least one remote recording and processing unit. For example, a dispatch and/or control station for a fleet of vehicles (e.g., trucks) can receive information related to the residual braking torque indicators from each of the vehicles, such as in order to determine when repairs are needed on any one of the vehicles.

As mentioned above, the disclosed devices and methods of measuring the residual braking torque based on signals from intelligent brake pads can be used in onboard applications and in substantially real time. The disclosed devices and methods can also be applied in other uses, such as on a traditional dynamometer bench test, jointly or in lieu of standard known torque measurements.

The invention thus conceived is susceptible to numerous modifications and variants all falling within the inventive concept. For example, the device for the detection of the residual braking torque according to the invention can be envisaged in a vehicle equipped with drum brakes comprising, for each wheel of the vehicle, of at least one piezoceramic sensor integrated beneath the friction material of the brake drum shoes.

Various features of the invention can be replaced by technically equivalent elements. For example, some embodiments include the use of sensors integrated on board a brake pad, with particular reference to temperature sensors, preferably PT1000 type sensors, positioned on the screen printed circuit integrated into the metallic support of the intelligent brake pad. In addition, to complete the offer of the information available from this intelligent sensor, it is also possible to integrate a wear sensor or a brake pad wear indicator at a software level within the electronic control unit that manages the data from the intelligent brake pads obtained on the basis of the raw brake pad data. The residual braking torque data for each wheel, and the related contributions from individual brake caliper pads (e.g., the related brake pad temperature data and the level of wear of the same) can be transmitted to the vehicle on board multimedia service platform, to the "body computer" of the vehicle, or to a microprocessor belonging to said platform and/or system. This can trigger visual or other alarms, and/or can indicate (e.g., to a user) to manage the data provided by the intelligent brake pad electronic control unit. The transmission of the data from the electronic control unit that manages the sensor data and the multimedia service system of the vehicle can take place via cable or wirelessly. In the latter case it is preferable that the electronic control unit that manages the brake pad is integrated in the immediate vicinity of the brake pad, and preferably within the detachable part of the connector, which will integrate the control unit and wireless transmission system in place of the data transmission cable. A power source, such as a small battery or energy recovery device (thermal or mechanical), can be provided to feed some or all the electronics needed for the overall operation of the electronics. To aid in integrating everything and at low power, the entire system can be implemented using an ASIC (Application Specific Integrated Circuit).

Certain Terminology

Although certain devices, systems, and processes have been disclosed in the context of certain example embodiments, it will be understood by those skilled in the art that the scope of this disclosure extends beyond the specifically disclosed embodiments to other alternative embodiments and/or uses of the embodiments and certain modifications and equivalents thereof. Use with any structure is expressly within the scope of this present disclosure. Various features and aspects of the disclosed embodiments can be combined with or substituted for one another in order to form varying modes of the assembly. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Terms of orientation used herein, such as "top," "bottom," "proximal," "distal," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Some embodiments have been described in connection with the accompanying drawings. The figures are to scale, but such scale should not be limiting, since dimensions and proportions other than what are shown are contemplated and are within the scope of the disclosed present disclosure. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

SUMMARY

Various illustrative embodiments of devices, systems, and methods have been disclosed. Although the devices, systems, and methods have been disclosed in the context of those embodiments, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

The following is claimed:

1. A method for measuring residual braking torque, comprising:
   with an electronic control unit,
      receiving signals output from a force sensor positioned on a vehicle brake pad, the signals indicating at least one of braking shear force and braking pressure;
      performing at least one of frequency domain and time domain analysis of the signals from the force sensor to determine a residual braking torque indicator that indirectly indicates the residual braking torque applied by the brake pad, without direct measurement of the residual braking torque, wherein the determination of the residual braking torque indicator includes detection of a structure of oscillations of an intensity of the signals over time, wherein the oscillations are associated with an angular velocity of rotation of a wheel of the vehicle; and
      converting the residual braking torque indicator to a measurement of residual braking torque applied by the brake pad using a calibration comprising a relationship between the residual torque indicator and residual braking torque.

2. The method according to claim 1, wherein a connector is integrated into the brake pad, and the connector is connected to the electronic control unit via an electric cable.

3. The method according to claim 1, wherein a connector is integrated into the brake pad, and includes a wireless data transmission module in order to communicate with at least one vehicle on board computer via at least one dedicated communication system.

4. The method according to claim 1, further comprising activating an alarm in response to the residual braking torque on the wheel exceeding a threshold value.

5. The method according to claim 1, wherein the force sensor comprises a piezoceramic sensor.

6. The method according to claim 1, wherein the electronic control unit comprises at least one friction material wear indicator.

7. The method according to claim 1, wherein the residual braking torque is determined based on empirical test data of measured residual braking torque.

8. A method for measuring residual braking torque, comprising:
- with an electronic control unit,
- receiving signals output from a force sensor positioned on a vehicle brake pad, the signals indicating at least one of braking shear force and braking pressure;
- performing a frequency domain analysis of the signals from the force sensor to determine a residual braking torque indicator that indirectly indicates the residual braking torque applied by the brake pad, without direct measurement of the residual braking torque, wherein the determination of the residual braking torque indicator includes detection of a specific peak structure within a frequency spectrum of the signals, wherein the specific peak structure is associated with an angular velocity of rotation of a wheel of the vehicle that indirectly indicates the residual braking torque applied by the brake pad; and
- converting the residual braking torque indicator to a measurement of the residual braking torque applied by the brake pad using a calibration comprising a relationship between the residual torque indicator and residual braking torque.

9. The method according to claim 8, wherein the residual braking torque is determined based on empirical test data of measured residual braking torque.

10. The method according to claim 8, further comprising activating an alarm in response to the residual braking torque on the wheel exceeding a threshold value.

11. The method according to claim 8, wherein the electronic control unit further comprises at least one friction material wear indicator.

12. The method according to claim 8, wherein a connector is integrated into the brake pad, and the connector is connected to the electronic control unit via an electric cable.

13. The method according to claim 8, wherein a connector is integrated into the brake pad, and includes a wireless data transmission module in order to communicate with at least one vehicle on board computer via at least one dedicated communication system.

14. A method for measuring residual braking torque, comprising:
- with an electronic control unit,
- receiving signals output from a force sensor positioned on a vehicle brake pad, the signals indicating at least one of braking shear force and braking pressure;
- performing frequency domain analysis of the signals from the force sensor to determine a residual braking torque indicator that indirectly indicates the residual braking torque applied by the brake pad, without direct measurement of the residual braking torque,
- wherein said performing the frequency domain analysis comprises using a band-pass filter operating at around 50 Hz; and
- converting the residual braking torque indicator to a measurement of the residual braking torque applied by the brake pad using a calibration comprising a relationship between the residual torque indicator and residual braking torque.

15. The method according to claim 14, wherein the residual braking torque is determined based on empirical test data of measured residual braking torque.

16. The method according to claim 14, wherein the electronic control unit further comprises at least one friction material wear indicator.

17. The method according to claim 14, wherein a connector is integrated into the brake pad, and the connector is connected to the electronic control unit via an electric cable.

18. The method according to claim 14, wherein a connector is integrated into the brake pad, and includes a wireless data transmission module in order to communicate with at least one vehicle on board computer via at least one dedicated communication system.

19. The method according to claim 14, further comprising activating an alarm in response to the residual braking torque exceeding a threshold value.

* * * * *